United States Patent [19]

Oppenheimer et al.

[11] Patent Number: 5,282,270
[45] Date of Patent: Jan. 25, 1994

[54] NETWORK DEVICE LOCATION USING MULTICAST

[75] Inventors: Alan B. Oppenheimer, Cupertino; Sean J. Findley, Gilroy; Gursharan S. Sidhu, Menlo Park, all of Calif.

[73] Assignee: Apple Computer, Inc., Cupertino, Calif.

[21] Appl. No.: 534,154

[22] Filed: Jun. 6, 1990

[51] Int. Cl.$^5$ .......................................... H04L 12/46
[52] U.S. Cl. .............................. 395/200; 364/DIG. 1; 364/242.94; 364/242.95; 364/242.96; 364/284; 364/284.4
[58] Field of Search ...................... 395/200, 325, 700; 370/60, 94.1, 94.2, 94.3

[56] References Cited

U.S. PATENT DOCUMENTS

| | | | |
|---|---|---|---|
| 4,644,470 | 2/1987 | Feigenbaum et al. | 395/200 |
| 4,677,588 | 6/1987 | Benjamin et al. | 395/325 |
| 4,864,559 | 9/1989 | Perlman | 370/60 |
| 4,914,571 | 4/1990 | Baratz et al. | 395/600 |
| 5,095,480 | 3/1992 | Fenner | 370/94.1 |
| 5,150,464 | 9/1992 | Sidhu et al. | 395/200 |
| 5,166,931 | 11/1992 | Riddle | 370/94.1 |
| 5,185,860 | 2/1993 | Wu | 395/200 |
| 5,191,650 | 3/1993 | Kramer et al. | 395/200 |

Primary Examiner—Dale M. Shaw
Assistant Examiner—Lance L. Barry
Attorney, Agent, or Firm—Blakely, Sokoloff, Taylor & Zafman

[57] ABSTRACT

A method and apparatus for determining the location of an entity using an alias (or entity name) in a communication system. A second node or entity transmits a first signal to a first router connected to a first local network of the communication system including the alias, wherein the alias includes a zone name. The first router forwards a second signal including the entity name from the first signal to other routers in the network until a second router connected to nodes having the zone name in the entity name is located. Each second router translates the second signal into a third signal which includes the alias, and using a first zone multicast address, multicasts the third signal to a first set of nodes. Each node of the first set of nodes determines whether the zone name contained within the alias is equal to a zone identifier for each node of the first set of nodes. Each node having the zone name determines whether the alias contained within the third signal is equal to alias information for the node. A first entity having the alias then transmits a fourth signal, which includes its network address, to the second entity in response to the third signal.

14 Claims, 17 Drawing Sheets

NETWORK DEVICE LOCATION USING MULTICAST

BACKGROUND OF THE INVENTION

1. Field of the Invention

The present invention relates to an apparatus and method for transferring data between a source and a plurality of receiving data processing devices. More particularly, this invention relates to determining the address of a process residing in a device having an alias ("entity name").

2. Background Information

In the computing industry, it is quite common to transfer data and commands between a plurality of data processing devices, such as computers, printers, displays, terminals, and other network resources. Interconnection of computers and other peripheral devices principally developed in the early 1970s with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902 and 4,689,786. In the AP-PLETALK ® brand (a trademark of Apple Computer, Inc.) network system, each "node" or computer, printer, peripheral, and other network resource, previously had a unique 8 bit identifier which allowed the node to filter out transmissions directed to other nodes. Since the 8 bit identifier, or node ID, was 8 bits in length, the number of nodes or computers and peripherals and other network resources in the LAN was limited to 254 (this number is less the values where all the bits are set and all of the bits are clear, which are reserved). This has resulted in a limitation in the utility of such LANs, since an expansion beyond the 254 node limit required the connection of additional hardware to the system, such as network routers and/or other hardware devices. This resulted in an increase of the complexity of the local area network, as well as an increase in its cost.

As will be described, the present invention provides a local area network for communication and resource sharing among various computers, servers, disks, printers, modems, and other data processing devices, peripherals and network resources, which increases the current 254 node limit to nearly $2^{24}$ or approximately 16 million nodes while remaining compatible with earlier non-extended local area networks which may still be connected to it through network routers. Specifically, this invention relates to the determining of the address of a process in a node having a given alias ("entity name").

SUMMARY AND OBJECTS OF THE INVENTION

One object of the present invention is to determine the location of a device on a communication system having an alias.

Another object of the present invention is to determine whether an alias is presently being used on a communication system.

Another object of the present invention is to determine the multicast address of a node having a particular zone name.

Another object of the present invention is to update zone information contained in a node.

These and other objects of the present invention are provided for by a method, in a communication system for transferring data between a plurality of devices, for determining the location of a first entity. A second entity transmits a first signal to a first routing means connected to a first local network of the communication system, wherein the first signal includes an alias, wherein the alias includes a zone name, and the first local network includes the second entity. The first routing means translates the first signal into a second signal which includes the alias, and transmits the second signal to at least one second routing means, each at least one second routing means coupled to at least one second local network of the communication system. Each at least one second routing means translates the second signal into a third signal which includes the alias, and transmits the third signal to a first set of nodes. The first set of nodes comprises at least one first node, and each of the first set of nodes has a first zone multicast address, wherein the value of the first zone multicast address is equivalent to a second zone multicast address which was computed from the zone name. Each of the first set of nodes determines whether the zone name contained within the alias is equal to a zone identifier contained in each of the first set of nodes. Each of the first set of nodes having the zone identifier equal to the zone name contained within the alias becomes a second set of nodes, wherein the second set of nodes comprises at least one second node. Each of the second set of nodes then determines whether the alias contained within the third signal is equal to alias information contained within each of the second set of nodes. The first entity, being a part of the second set of nodes and having alias information contained within it that is equal to the alias contained within the third signal, transmits a fourth signal to the second entity, wherein the fourth signal includes the address of the first entity.

These and other objects of the present invention are provided for by a method for determining a zone multicast address from a zone name by first initializing a hash value to zero. Then each byte comprising the zone name is converted to an uppercase value. For each byte comprising the zone name, each uppercase value for each byte comprising the zone name is added to and then stored in the hash value and then the hash value is rotated one bit left. If the final hash value equals zero then all bits in the hash value are set. An index value is then determined by computing the hash value modulo a first value, wherein the first value is the number of entries in a table containing a plurality of multicast addresses. This index value is then used to retrieve a first multicast address and the first multicast address is stored into a second value.

These and other objects of the present invention are provided for by a method used by a first entity for changing the zone in which it resides when it receives a first signal, the first signal containing old zone information and new zone information. The old zone information contained in the first signal comprises a zone name, and the new zone information contained within the first signal and the zone information contained within the first entity each comprise a zone name and a zone multicast address. If the old zone information contained within the first signal is equivalent to zone information contained within the first entity, then the zone information in the first entity is set equal to the new zone information contained within the first signal.

BRIEF DESCRIPTION OF THE DRAWINGS

The present invention is illustrated by way of example and not limitation and the figures of the accompanying and in which like references indicate similar elements and in which.

DETAILED DESCRIPTION OF THE PREFERRED EMBODIMENT

A local area network node startup method for assigning a unique address is described. In the following description for the purposes of explanation, specific numbers, bytes, registers, addresses, times, signals, and formats are set forth in order to provide a thorough understanding of the present invention. However, it will be apparent to one skilled in the art that the present invention may be practiced without the specific details. In other instances, well known circuits and devices are shown in block diagram form in order to not unnecessarily obscure the present invention.

Figure 1:
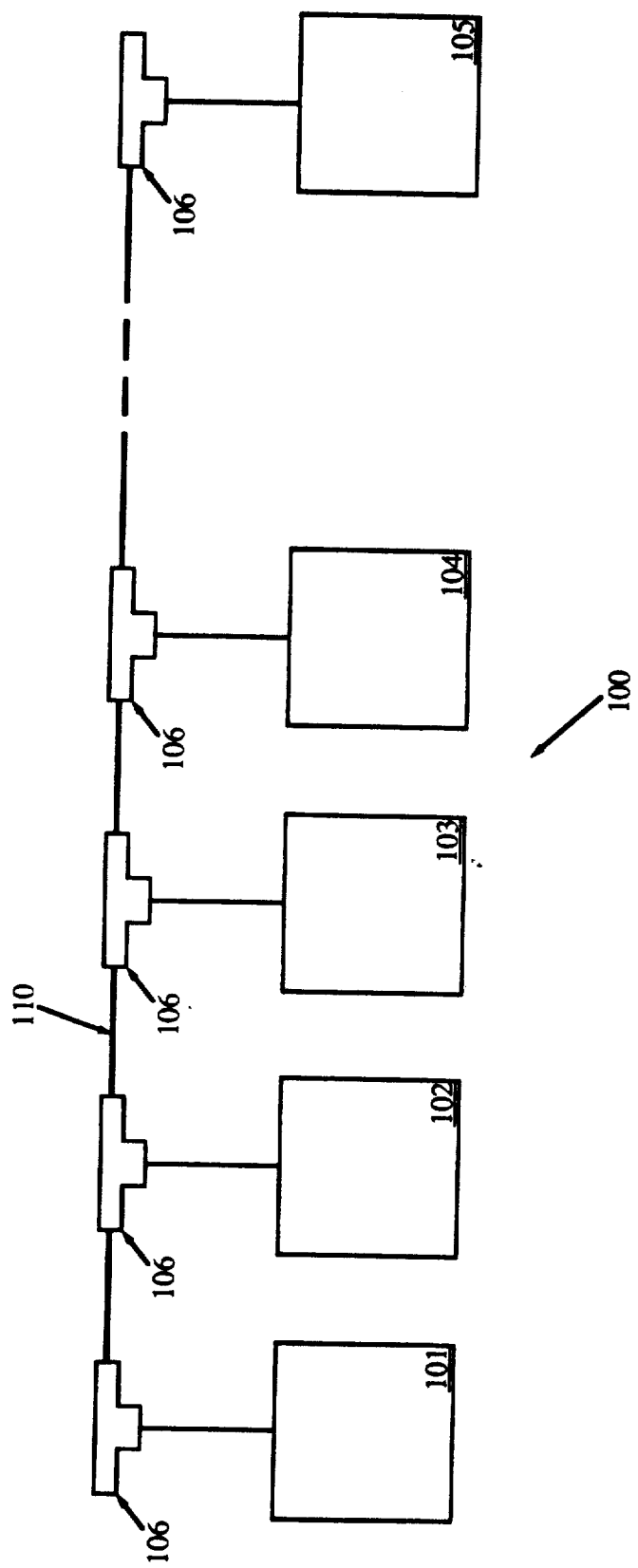
FIG. 1 shows a local area network (LAN) on which the preferred embodiment of the present invention is implemented.

Referring to FIG. 1, the present invention may include a plurality of data processing devices or network resources identified generally by the numbers 101 through 105. These network resources may include, among other things, printers, modems, memory, disk devices, etc. For the purposes of this specification, all data processing and peripheral devices which are coupled to the network are collectively referred to as "entities." As shown, the entities 101 through 105 are interconnected for data transfer to one another by common cable 110. The entities are coupled to cable 110 by connection modules 106 on FIG. 1. It will be appreciated by one skilled in the art that cable 110 may comprise any shared media, such as co-axial cable, fiber optics, radio channel, twisted pair cable, or the like. The present invention permits access to various network resources such as data stored in local memories or disk and the common use of printers without the need to predefine addresses for each device coupled to cable 110.

Note that the network 100, shown in FIG. 1, in the preferred embodiment may be an ETHERNET (U.S. Pat. No. 4,063,220) standard networking system, under the Institute of Electrical and Electronic Engineers (IEEE) specification 802.3, or in an alternative embodiment a token-ring standard networking system under IEEE 802.5 or any other type of networking system such as fiber distributed data interface (FDDI) networking system. As is known in the art, the ETHERNET networking system is capable of transmission at rates of approximately ten megabits per second and belongs to the class of LAN's known as CSMA/CD (carrier sense multiple access with collision detection) systems. Using the CSMA/CD protocol, each data processing device 101-105 may not transmit on the network cable 110 as long as traffic is present (i.e. another node is already transmitting on cable 110). As soon as a node detects that cable traffic has ceased on cable 110, the node will wait for a certain mandatory time period to pass to allow the network to settle, and then the node will begin to transmit its data. This CSMA/CD protocol is used in conformance with IEEE specification 802.3 .

In an alternative embodiment, network 100 may be a standard token-ring networking system. In this case, networking cable 110 further couples nodes 101 and 105 directly so that the network 100 forms a complete loop. Data travels unidirectionally in the network 100 at a data rate of approximately four to sixteen megabits per second. Each connection module 106 is a "repeater," that is, when data is received from an adjoining node "upstream" from the receiving node, the token is placed back on the network cable 110. This is done after the node has examined the token to see if the node must act upon the token, and transform it accordingly, if required. In this alternative embodiment for network 100, the token-ring topology is driven in accordance with IEEE 802.5 specifications.

Figure 2:
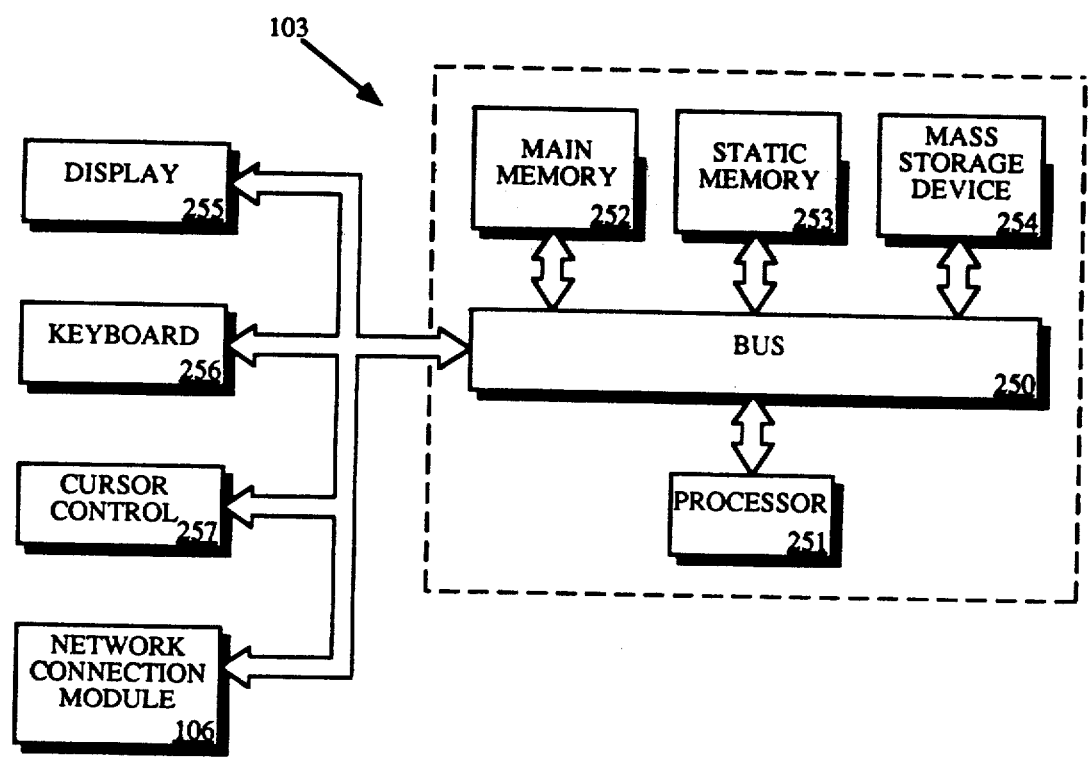
FIG. 2 shows a detailed representation of one computer in the Local Area Network.

FIG. 2 illustrates one node on network 100, for instance 103, which may be a computer system upon which the preferred embodiment of the present invention is implemented. Computer system 103 comprises a bus or other communication means 250 for communicating information, a processing means 251 coupled with bus 250 for processing information, a random access memory (RAM) or other dynamic storage device 252 (commonly referred to as main memory) coupled to bus 250 for storing information and instructions for processor 251. Computer system 103 also comprises a read only memory (ROM) and/or other static storage device 253 coupled to bus 250 for storing static information and instructions for the processor 251, a data storage device 254, such as a magnetic disk or optical disk and disk drive, coupled to bus 250 for storing information and instructions. Computer system 103 further comprises a display device 255, such as a cathode ray tube (CRT), coupled to bus 250 for displaying information to the computer user, an alpha-numeric input device 256, including alpha numeric and other keys, coupled to bus 250 for communicating information and command selections to processor 251, and may also comprise a cursor control device 257, such as a mouse, a track ball, or cursor direction keys, coupled to bus 250 for communicating direction information and command selections to processor 251 and for controlling cursor movement. Computer system 103 may also be coupled to connection module 106 via bus 250.

In the preferred embodiment computer system 103 is one of the MACTINTOSH family of personal computers, such as the MACINTOSH SE or MACINTOSH II manufactured by Apple Computer, Inc. of Cupertino, Calif. Processor 251 is one of the 68000 family of microprocessors manufactured by Motorola, Inc. of Schaumburg, Ill.

A description of some of the foregoing may be found in Inside Apple Talk ®, by Gursharan Sidhu, Richard F. Andrews, and Alan B. Oppenheimer (1st Ed. 1989) published by Addison-Wesley.

Figure 3:
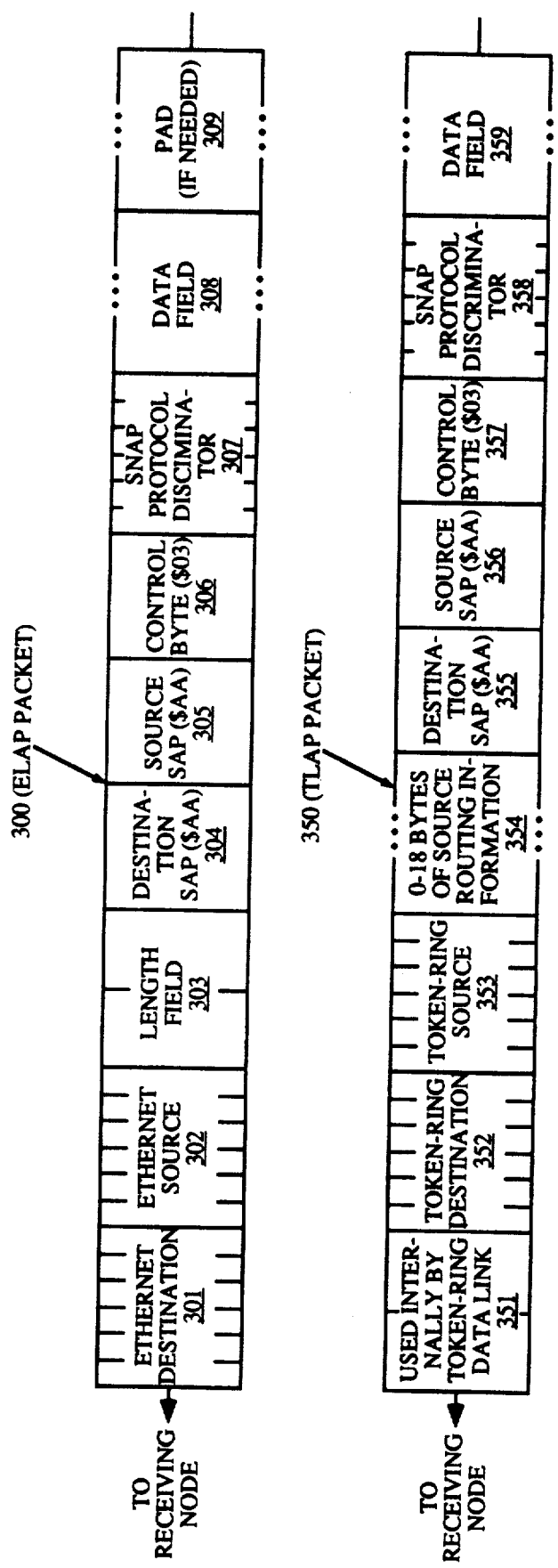
FIG. 3 shows packets used for transmission of data between nodes in the preferred embodiment.

Referring now to FIG. 3, the present invention utilizes a basic unit of transmission known as a "frame." Two frames are shown in FIG. 3. Frame 300 is an extension of the "ETHERNET" network standard packet, and uses a protocol known in the present preferred embodiment as the "ETHERTALK Link Acess Protocol" or ELAP. Frame 350 is an extension of the "Token-ring" standard packet and uses a protocol in an alternative embodiment known as the "TOKENTALK Link Access Protocol" or TLAP. For the purposes of the remainder of this application, each byte is 8 bits in length. Depending on whether network 100 in the preferred embodiment is an ETHERNET or Token-ring network system in the alternative embodiment, the corresponding packet will be used. In other words, if the network 100 is an ETHERNET, the packets transmitted are in the format of an ELAP packet, frame 300. If network 100 in an alternative embodiment is a Token-ring network, the packets transmitted are in the format of a TLAP packet, frame 350.

To understand the two packets (frames) shown in FIG. 3, it is necessary to understand the concept of a Service Access Point (SAP). SAP's are defined in the IEEE 802.2 specification and are used to differentiate between protocol stacks used in a given node. Since the currently performed embodiments use slightly different data packets than standard ETHERNET and Token-ring networking systems, the SAP quantities 304 and 305 in frame 300, and 355 and 356 in frame 350 are represented with the values $AA. This informs the hardware and software that certain non-IEEE standard protocol software is being used in networking system 100. Note that for the remainder of this application certain values will be represented in hexadecimal notation (base 16). These values are preceded by a "$".

In the present system, notice that it is also necessary to distinguish between the various protocol families used since the SAP quantity merely identifies that the packet being sent is in a non-IEEE standard format. Therefore, the present embodiment uses an additional five-byte quantity known as the Sub Network Access Protocol or SNAP. The SNAP quantity is shown in FIG. 3 as 307 in frame 300, and 358 in frame 350. This SNAP quantity identifies the particular subprotocol being used in the packet. The SNAP quantity will vary according to which particular protocol stack the packet corresponds. The values contained within these SNAP fields are discussed below.

In the preferred embodiment for an ETHERNET network 100, the frame 300 comprises a header comprising the elements 301, 302, and 303. 301 is known as the ETHERNET destination address. This address is 6 bytes in length and indicates the ETHERNET destination address of the node to which the packet is directed. 302 is also 6 bytes in length and is known as the ETHERNET source address indicating the source node from which the packet has been transmitted. In both the ETHERNET system and the Token-ring system, these 6-byte quantities are static hardware addresses residing in connection modules 106 in network 100. 303 in frame 300 is known as a length field and specifies the total length of the data that follows. The next three fields of frame 300 are known as the IEEE 802.2 header. This header specifies the source and destination SAPs being used, and a control byte indicating the type of packet. The destination and source SAP fields 304 and 305 in frame 300, as discussed above, are both equal to $AA. These values indicated that it is a non-standard IEEE protocol being used by both the destination and source nodes for the addresses given in 301 and 302. The third portion 306 of the 802.2 header is known as a control byte and it contains the value $03, indicating an 802.2 data packet is being used. The next five bytes in frame 300 are known as the SNAP protocol discriminator and indicates to the data link the type of packet being transmitted. For instance, for a standard APPLETALK ® (brand networking system) protocol discriminator, field 307 contains the value $080007809B. For an APPLETALK ® (brand networking system) Address Resolution Protocol (AARP) packet the value is $00000080F3. AARP is discussed below.

The next two fields of a standard ELAP packet in frame 300 is the data field 308 and a padding field 309. The data field 308 contains certain data, depending on the particular protocol being implemented and the type of packet being transmitted, which will be discussed below. This may include the source and destination protocol addresses as well as any data. Finally, the last field in frame 300 is a padding field, and is used if the packet does not equal the minimum 60 bytes of information required for an ETHERNET packet. Therefore, if frame 300 is less than the minimum 60 bytes in length, bytes are inserted into the pad field 309 until the packet equals 60 bytes in length.

In an alternative embodiment implementing the token-ring architecture for network 100, TLAP frame 350, as shown in FIG. 3, is used as the standard transmission packet. Frame 350 first comprises a TLAP header comprising 8 fields. The TLAP header starts with a field 351 being a unique 2 byte identifier for use within the Token-ring network. The next 6 bytes are used for the Token-ring node destination address 352, and the following 6 bytes are used for the Token-ring node source address 353 for the node transmitting the packet. As in the ETHERNET system, the 6 byte node hardware addresses in fields 352 and 353 are statically assigned to each of the nodes comprising network 100. The following field 354 may be 0 to 18 bytes long and comprises source routing information. This information is used by the Token-ring networking system if the high order bit of the source hardware address 353 is set. If that bit is not set, then field 354 is 0 bytes in length, and there is no routing information contained in the packet. However, if the most significant bit of 353 is set, then the routing information may comprise 2 to 18 bytes of source routing information indicating which bridges in the network the packet 350 must traverse in order to reach the destination node specified in field 352.

The next three fields, 355, 356 and 357 of the TLAP packet 850 is the IEEE 802.2 specification header. Each field comprises one byte of information. Fields 355, 356 and 357 contain the same values as fields 304, 305 and 306 in the ELAP 802.2 header of frame 300. The destination SAP field 355 contains $AA, the source SAP field 356 contains $AA, and the control byte 357 is set equal to $03, indicating that it is a data packet being transmitted. The next field 358 of the TLAP packet 350 is the SNAP protocol discriminator comprising six bytes. Again, this field contains the same value as 307 in frame 300 depending on the type of packet being transmitted. The remainder of the frame 350 comprises a data field 359, which will contain certain information as in ELAP field 308.

Figure 4:
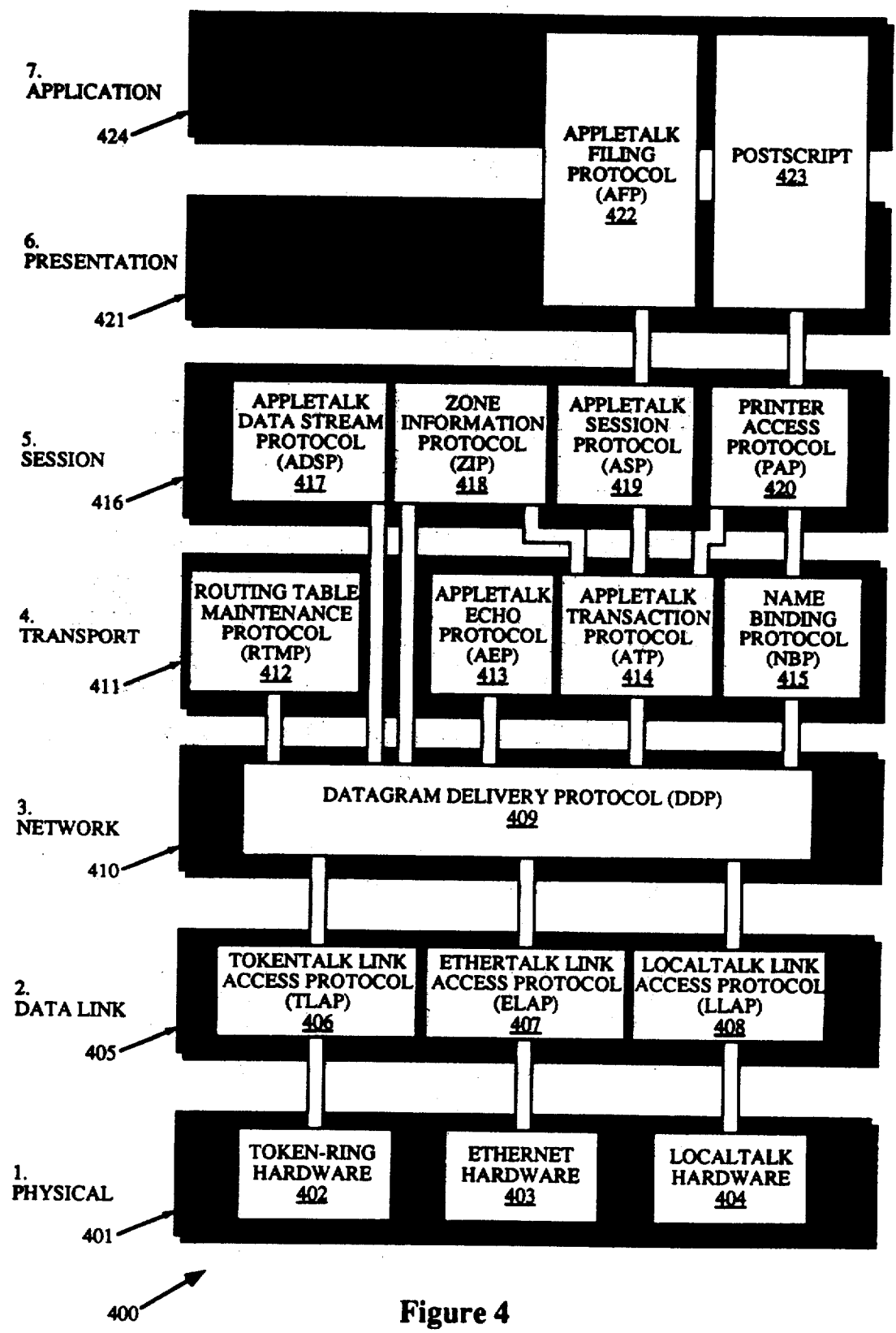
FIG. 4 shows a representation of the various protocol stacks used in the preferred embodiment.

Referring to FIG. 4, an example of the layers of protocols used in the present invention is shown as 400. The diagram shown in FIG. 5 as 400 shows the presently preferred embodiments as corresponding to the International Standards Organization (ISO) and the Open Systems Interconnection (OSI) reference model (the ISO-OSI reference model). This model defines the concepts of a protocol and a service interface that defines a protocol architectural framework consisting of 7 layers comprising: Physical 401, Data Link 405, Network 410, Transport 411, Session 416, Presentation 421, and Application 424. Each layer may be thought of as a separate process or filter which either appends protocol information onto existing data packets transmitted in system 100, or routes appropriate data packets through network system 100 depending on the type of packet and the particular layer in which the packet resides. The various layers allow packets to be transmitted from one variety of hardware to another, and one process (socket) to another. For instance, the packets described with reference to FIG. 3, frames 300 and 350, which employ the ELAP and TLAP protocols, are utilized at the data link 405 layer of the networking system which have been translated from the network layer 410 portion of the networking system, using the Datagram Delivery Protocol 409 (DDP). Protocols such as Routing Table Maintenance Protocol (RTMP) 412, the APPLETALK ® (brand networking system) Echo Protocol 413 (AEP), Zone Information Protocol (ZIP) 418, and the APPLETALK ® (brand networking system) Filing Protocol (AFP) 422 reside at the higher levels in the protocol "stack" such as 411, 416, 421, and 424.

Figure 5:
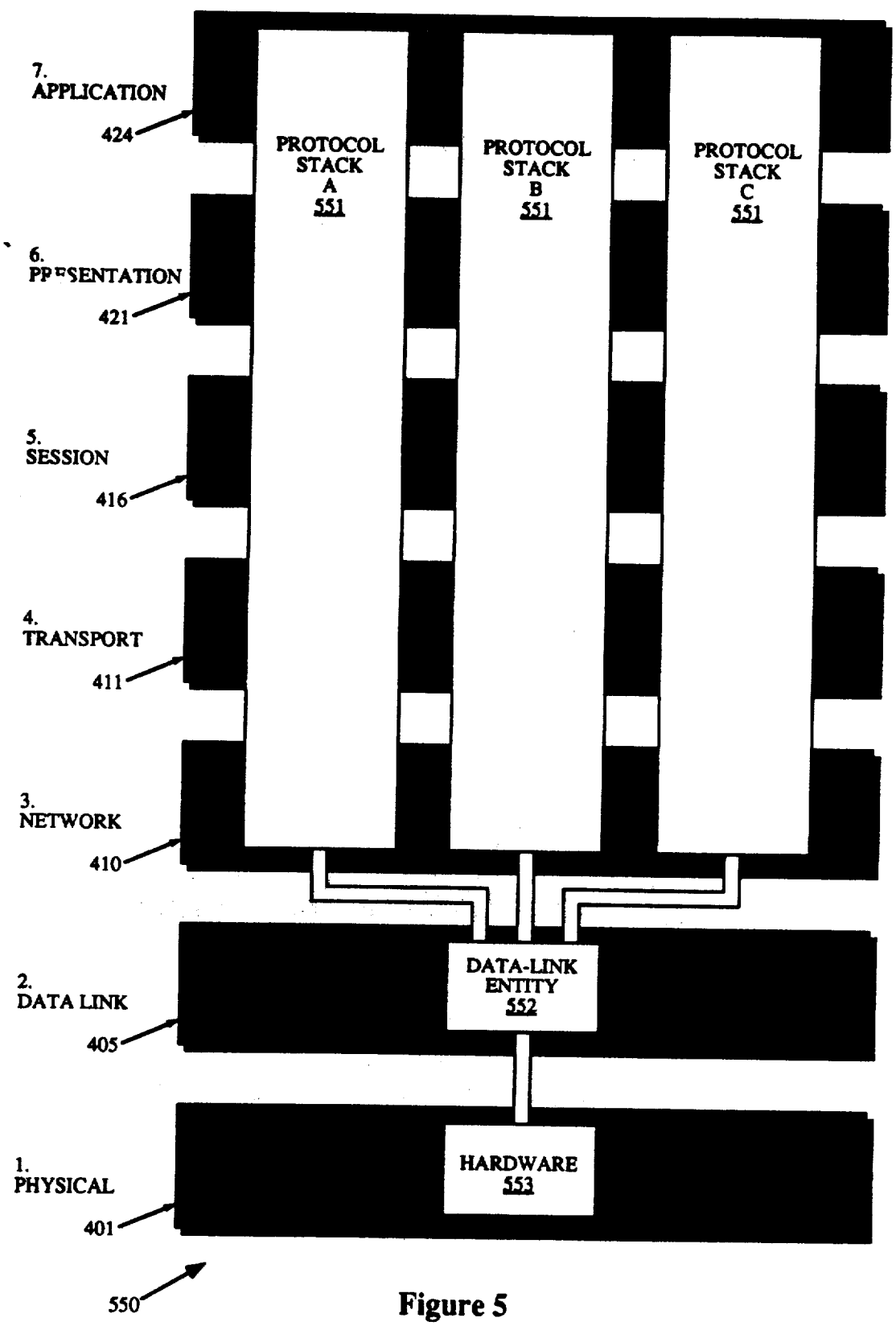
FIG. 5 shows the protocol stacks and data link organization as it relates to translation of protocol addresses into hardware addresses in the preferred embodiment.

Referring to FIG. 5, the present invention utilizes a scheme known as "address resolution" which converts an address used in a high level stack from a protocol address to a hardware address of a particular node on the LAN. This high level address generally resides in layer 410 of the protocol stacks 551. Each of these protocol "stacks" correspond with the protocol layers shown on FIG. 4 as Network 410, Transport 411, Session 416, Presentation 421 and Application 424. For instance, each protocol stack may incorporate a different set of high level protocol addresses corresponding to the specific instance of that stack for the given nodes. As shown in 550 of FIG. 5, the protocol stacks A, B, and C 551 use data link entity 552 to resolve those protocol addresses into hardware addresses used at level 553. In the preferred embodiment, the address resolution from the high level protocol stacks 551 to the data-link entities such as ELAP or TLAP residing at level 552 in the ISO-OSI model is performed by a process known as the APPLETALK ® (brand networking system) Address Resolution Protocol, or AARP. In order to resolve protocol addresses residing at levels 551 and 552 into hardware addresses used at level 553, AARP expects certain packets from nodes in network 100. The packets expected by AARP ' e shown in FIG. 6.

Figure 6:
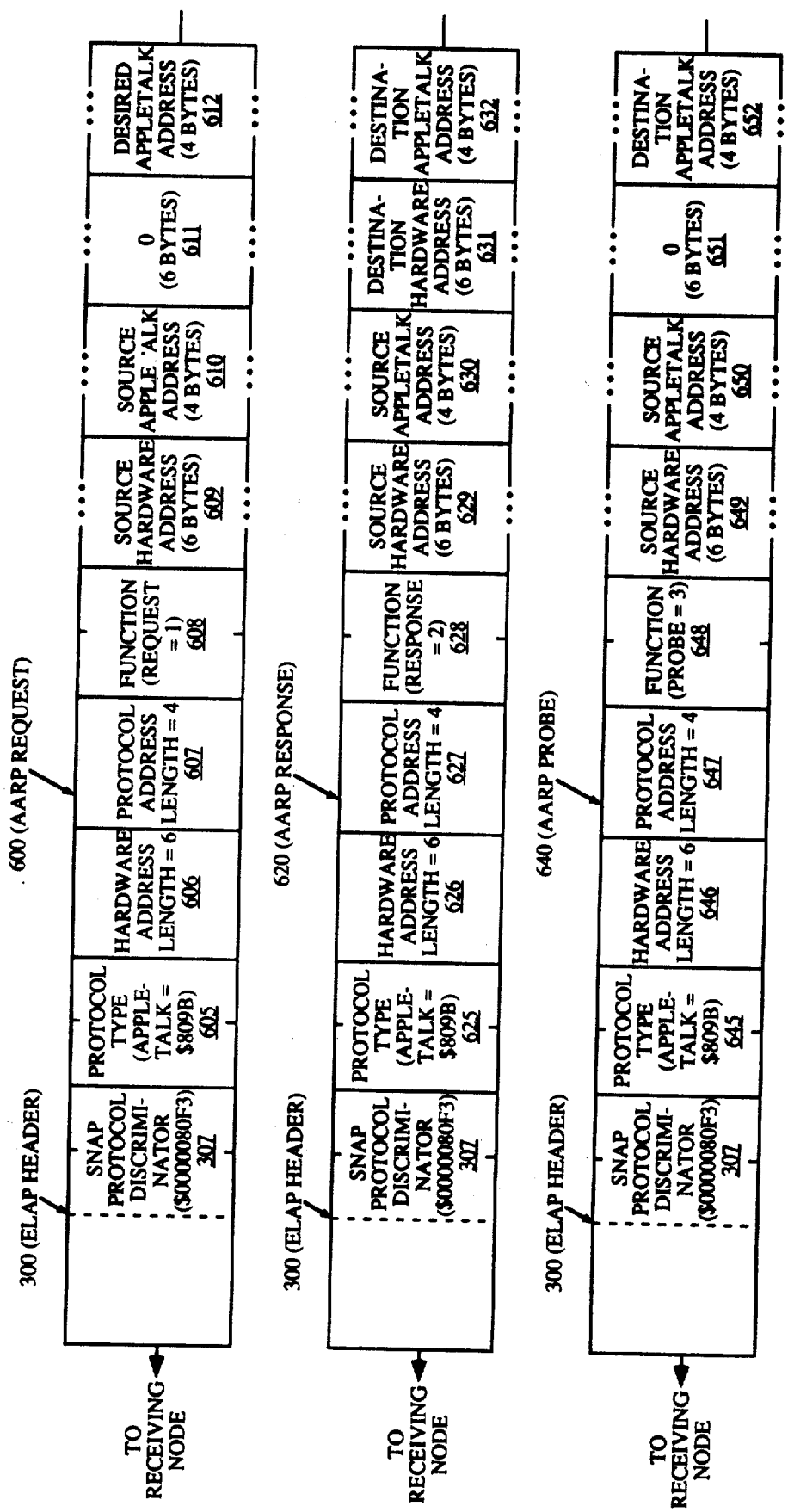
FIG. 6 shows address resolution protocol packets which are used in the preferred embodiment for determining the availability of certain protocol addresses.

FIG. 6 shows the three types of p .kets which may be used in AARP. As shown in FIG. 6, each of packets 600, 620, and 640 contain similar information, with some exceptions. The packets 600 (fields 605–612), 620 (fields 625–632), and 640 (fields 645–652) each constitute the data field 308 portion of ELAP packet 300 for transmitting the packet to the appropriate node in network 100. The ELAP packet 300 is used for ETHERNET hardware in the preferred embodiment, but packet 350 may be used for Token-ring hardware in an alternative embodiment wherein packets 600, 620 and 640 will reside in field 359. The SNAP protocol discrminators 307 in ELAP packet 300 should contain $00000080F3 to indicate that it is an AARP packet being transmitted. The protocol type fields 605, 625, and 645 contain $809B for each of the packets. This indicates to the hardware that an APPLETALK ® (brand networking system) protocol address is being used.

Packets 600, 620, and 640 each comprise fields indicating a hardware address length 606, 626, and 646, and a protocol address length 607, 627, and 647. The hardware address length 606, 626, and 646 are constant for the three packets since the hardware addresses in the currently performed embodiments are each six bytes in length. The protocol address length contained in fields 607, 627, and 647 are the same for packets 600, 620, and 640 because the protocol address length in the present invention is always equal to four bytes.

The next field in packets 600, 620, and 640, is a two-byte function field indicating the type of AARP packet being transmitted. In 600, 608 contains a one, indicating that it is an AARP request packet being transmitted. In 620, the function field 628 contains a two, indicating that it is an AARP response packet. In 640, the function field 648 contains a three, indicating that it is an AARP probe packet. The AARP probe packet 640 is used to determine whether the address is currently being used by another node on the network. This probing function is discussed below. The next two fields in AARP packets 600, 620, and 640 are the source hardware address 609, 629, and 649, and the source protocol address 610, 630, and 650. The source hardware address 609, 629, and 649 is the static ETHERNET address which resides in the ETHERNET hardware. The source protocol address 610, 630, or 650 is the address maintained by the node as the current protocol address used by the layer 411 of the network model shown in FIG. 4 in order to communicate with the node.

As mentioned previously, the AARP protocol facilitates a mapping between addresses in the stack layers 551 and 552 in FIG. 5 to hardware addresses used in ETHERNET or token-ring layer 553 (ELAP 406 or TLAP 407). This address mapping is accomplished by the AARP process in each node maintaining an Address Mapping Table (AMT). An AMT is a list of hardware addresses (which are statically assigned to each node) along with corresponding protocol addresses for each protocol family used in network 100. When asked by a client (process) to determine a hardware address corresponding to a given protocol address, AARP scans the AMT in the node for that protocol address. If the protocol address is found in the AMT, AARP reads the corresponding hardware address and delivers it to the requesting client.

If the hardware address is not found in the AMT, en AARP tries to determine the hardware address by querying all nodes supporting the corresponding protocol family. This particular process is accomplished by using an AARP request 600 shown in FIG. 6. Whenever a new address mapping is determined, new AMT entries are entered for that specific protocol to correspond with the given hardware address. Old AMT mappings between hardware addresses and protocol addresses are purged using a least recently algorithm, and AMT entries are modified if given protocol or hardware addresses are modified.

If a request packet 600 or a probe packet 640 is sent and an AARP response 620 is received by the transmitting node, then the destination hardware address 631 can be placed into the AMT for the protocol address transmitted in the packet. From that point forward, the node may use the AMT to send a packet (datagram) to the node's hardware address directly without performing any address resolution between a protocol address and a hardware address. If a response packet is not received within a specified time interval after re-transmitting for a specified number of times the AARP probe 640 or request packet 600, then the transmitting node leaves that entry in its AMT blank. The failure to respond within a given time indicates that no node is using the protocol address.

Every time a packet is received from another node in the system, address information may be obtained by AARP since both the hardware address and protocol address is provided in ELAP packet 300. The method of updating AMT entries in this way is known as "gleaning". Some processes, at their option, may not perform address "gleaning" due to the overhead associated with updating address information every time a packet is received.

The source protocol address 610, 630, and 650 in the packet is provided by the node using a mapping in the AMT if the node knows what its corresponding protocol address is. At the time of dynamic address assignment, the source protocol address field 650 of packet 640 is set to the address which is being determined whether unique or not. In an AARP request packet 600 or an AARP response packet 620, fields 610 and 630 should contain the protocol address of the requesting or responding node.

The next fields 611, 631, and 651 are each six bytes in length and are not used in packets AARP request 600 and AARP probe 640. In AARP response packet 620, the destination hardware address is provided in field 631.

In packets 600, 620, and 640, each field 612, 632, and 652 is used to transmit a requested or destination protocol address by a transmitting node. This protocol address is four bytes in length. In an AARP request 600, the protocol address for which a hardware address is desired is transmitted in field 612. In an AARP response packet 620, field 632 is used to transmit the protocol address for the node with the hardware address transmitted by an AARP request packet 600 or an AARP probe packet 640. In packet AARP probe 640, a tentative protocol address 652 comprises the last four bytes of the packet. A tentative protocol address 652 is transmitted by a node during system power-up to determine if the protocol address is in use by any other node on the network. When such a probe is made, any node having a protocol address equal to the value contained within field 652 will transmit an AARP response packet 620 containing the same protocol address in field 630 and the corresponding hardware address in field 629. This indicates to the probing node that the protocol address is not available for use.

Figure 7:
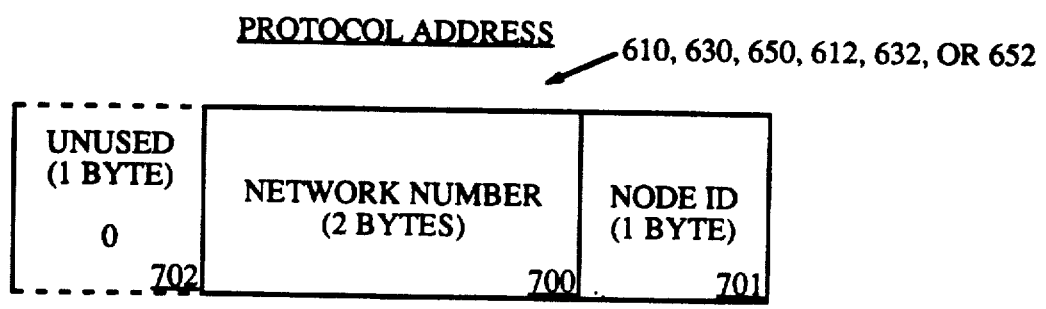
FIG. 7 shows a detailed representation of a protocol address used in data packets in the preferred embodiment.

Referring to FIG. 7, a detailed representation of the protocol addresses shown as 610, 630, 650, 612, 632, or 652 on FIG. 6 is shown. Notice that the address is broken into 3 distinct fields 700, 701, and 702. Notice that the field 702 (one byte in length) is not used at this time and must be set to zero. 700 is a two byte field which contains a "network number." The network number 700 represents a specific subset of nodes in a network 100. In the prior art, the network number represented all of the nodes on network 100 separated from the remainder of the internet by a device known as an internet router (IR). The network number 700 in the currently performed embodiments now simply represents a subset of nodes on network 100. Node ID 701 comprises a single byte, and represents a unique node within the subset of nodes indicated by network number 700. As mentioned previously, byte 702 is currently unused at this time, although space has been provided in the design of the present preferred embodiment to extend the 24 bit protocol address (network number 700 concatenated with the node ID 701) to a 32 bit value. Note that this protocol address, referred to in FIGS. 6 and 7, represents an address generated by one of the protocol stacks 551 of FIG. 5, specifically the APPLETALK ® (brand networking system) protocol stacks 400 shown in FIG. 4. These protocol addresses, as mentioned previously, are translated by AARP, into a six byte hardward address to be used at level 553 shown in FIG. 5 to build the ELAP header 300 or TLAP header 350.

Figure 8:
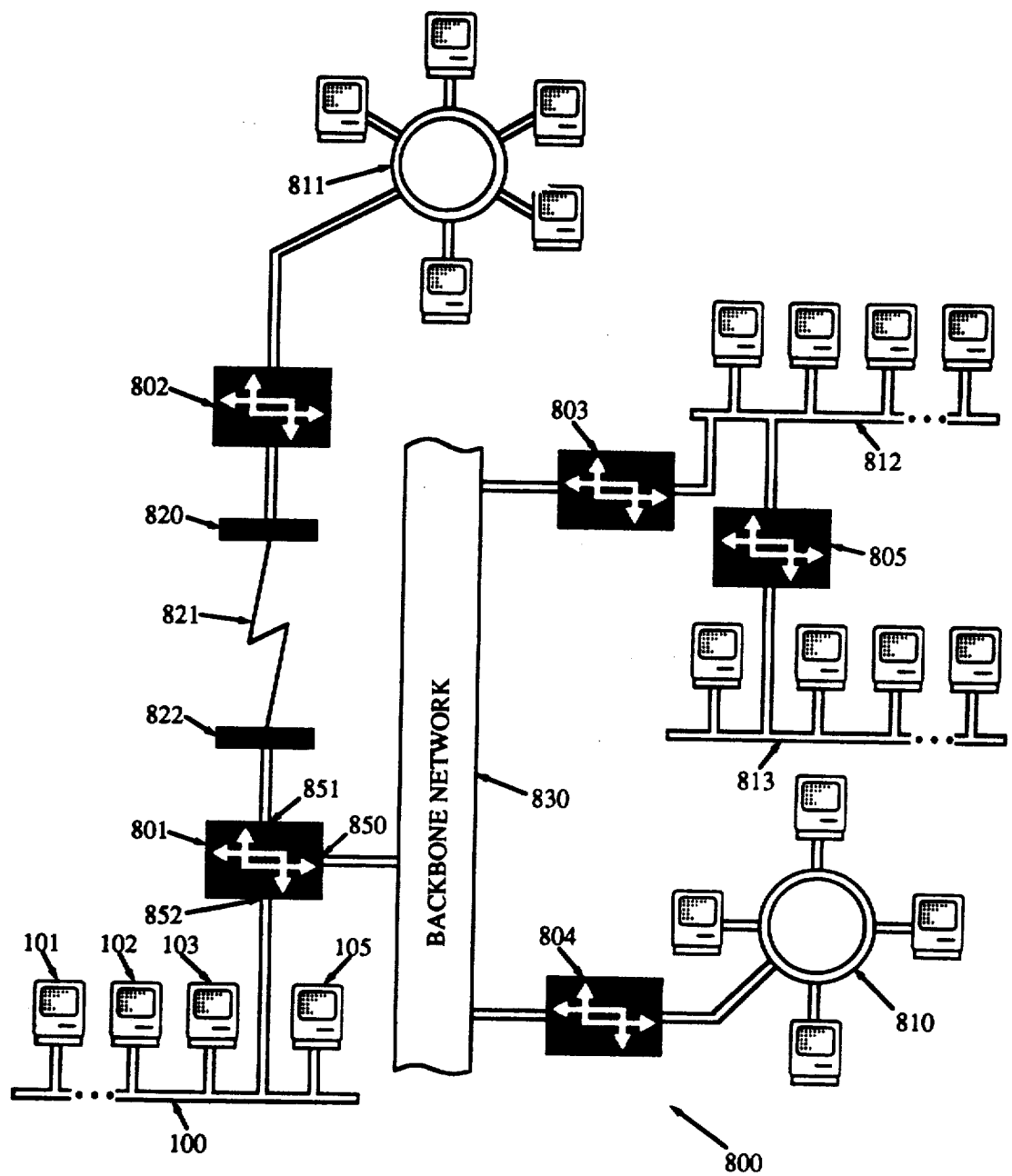
FIG. 8 shows an internetwork which connects several local area networks in the preferred embodiment, including routers used for routing information from one local area network to another.

A network 100 may be extended in a manner shown in FIG. 8. As is shown on FIG. 8, network 100 may be interconnected with several other networks making one large "internet" 800. For instance, router 801 can appear as node 104 through one of its ports 852 shown on FIG. 8. A router or internet router (IR) is a hardware device used for routing information from one network to another. A router, such as 801, 802, 803, 804 or 805, is used to connect several LANs onto an internet and distribute signals or data packets among the various local area networks. A router is a node with multiple ports and the ability to receive and forward packets between ports. It typically is a high performance computer to facilitate fast and efficient datagram routing within the network. It is known as a "store-and-forward" device, since it will store a datagram for a brief period of time and retransmit the packet through one of its ports onto the appropriate network to which it is linked. There are 3 types of routers in the currently performed embodiments: local routers; half routers; and backbone routers.

A local router is a router such as 805, which is used to connect two local networks, such as ETHERNETs 813 and 812, to one another. A half router is used to connect two networks across a communication link such as a phone line via such devices as modems or other high speed transmission devices. An example of a half router is shown as 802. 802 connects token-ring network 811 via communication device 820 across communication link 821. Communication link 821 may be a phone line or another type of communication line. Communication link 821 is then coupled to a second communication device 822 and then to router 801, which is linked to network 100.

Backbone routers are routers such as those shown as 803 and 804 in 1 which are used to couple a series of local area networks together, such as token-ring network 810 and ETHERNET 812 through a backbone network such as 830. A backbone network is often a higher capacity network than the local area networks discussed herein. The backbone network may be used to couple a high volume of nodes and other networks and provide very high speed transmission rates between networks and nodes. Also, backbone networks may range over a wider geographic area than typical LANs. Certain routers may have the properties of all three types of routers. Notice that 801 is coupled not only to a local area network making it a local router, but is also coupled to the backbone network and a communication link, giving it the properties of a backbone router and a half router.

Each router in the internet maintains certain information about its local environment and other routers on the internet. Each router has several ports or connections to the other networks or communication links to which it is connected. For each of the ports, information is maintained about the networks connected to each port. For instance, for router 801, information is maintained about each of the ports 104, 850, and 851 to which it is connected. The information is known as a "port descriptor" and consists of the following four fields:

1. a flag indicating whether the port is connected to an APPLETALK ® (brand networking system) network or not;
2. the port number;
3. the port node address (the router's node address in the network coupled to the port); and
4. the port's starting and ending network numbers (the starting and ending range of network numbers for the LAN connected to the port, a value referred to in the router as THIS-NETWORK-RANGE).

Each router does not need to have a THIS-NETWORK-RANGE value associated with it. At least one router on the local network (called the seed router) has a THIS-NETWORK-RANGE built into its port descriptor. The other routers on the network may acquire their network range by communicating with the seed router. Other routers on the local network may have a value of 0 in THIS-NETWORK-RANGE, but may not have a network range that conflicts with the seed router's THIS-NETWORK-RANGE. Although each router maintains a range of valid network numbers for the port in the preferred embodiment, in an alternative embodiment, the router may maintain a list of network numbers that reside on the given port.

In addition to maintaining a port descriptor for each port to which the router is connected, each router also maintains a routing table used to forward data packets for another network in the internet. For instance router 801 will maintain a routing table telling it where various networks in the internet, such as 812 and 811, may be reached. The routing table is essentially a list of networks connected through each of the router's ports, the network number range of each of these networks, the distance of each network away from the router measured in terms of hops (the minimum number of routers a datagram must traverse to reach the router) and the network number and node ID for the next IR through the given port. Therefore, when a router obtains a packet addressed to a network number and node ID that is not directly accessible through one of its ports, the packet is then forwarded through that port to the next IR on the path to the destination network so that the appropriate node will eventually receive the data packet.

Figure 9:
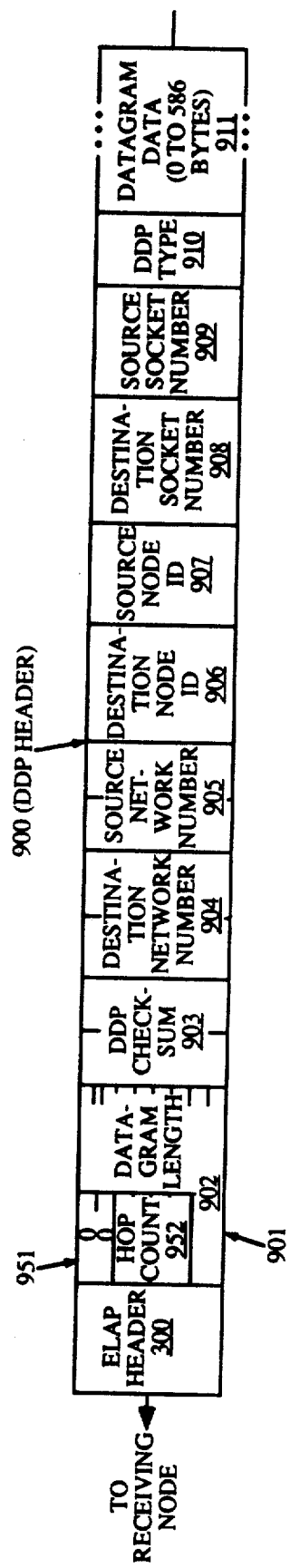
FIG. 9 shows a packet used for transmittal of data from one node in the internet to another node.

Additional information used for transmitting information between nodes in the internetwork is shown as 900 in FIG. 9. This detailed representation is the header information used by the Datagram Delivery Protocol 409 (DDP). This header is used at the network protocol stack level 410 shown in FIG. 4. The packet is part of the data field 308 of the ELAP packet 300. Note that the ELAP packet 300 may be packet 350 for a Token-ring system, in an alternative embodiment wherein 900 is part of data field 359. The next field 901 includes a hop count field 952 in its middle four bits. The two least significant bits of byte 901 are part of the next field 902. In the preferred embodiment the hop count 952 is initially set to zero at the source node and is incremented by one each time the packet traverses a router as shown in FIG. 8. If the hop count reaches a value of $F or 15 (decimal), then the packet is discarded (no longer forwarded) by the routers in the internet. This is because in the preferred embodiment, the number of "hops" or internet routers a packet may traverse is limited to 16.

Figure 10:
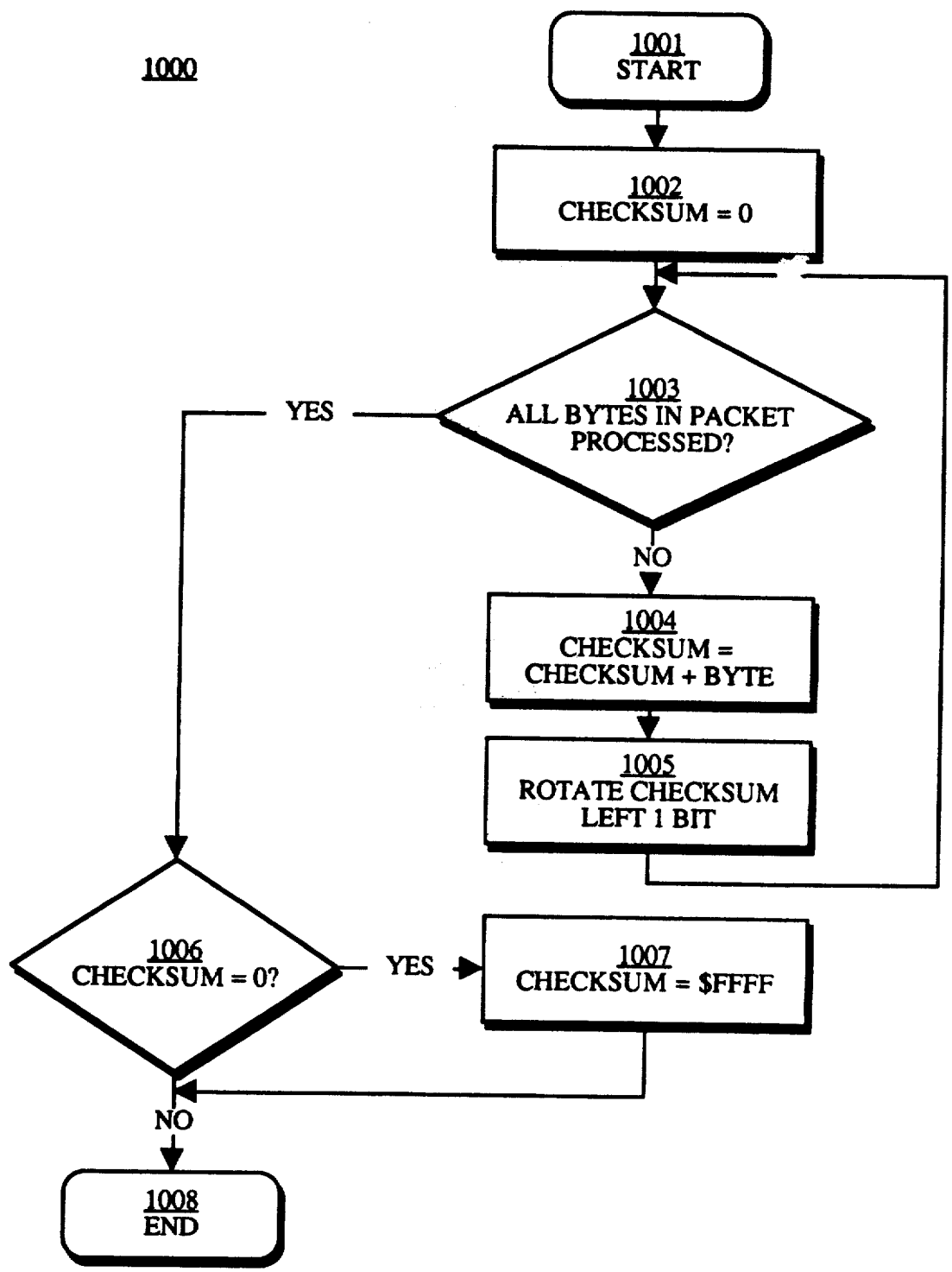
FIG. 10 shows the process of generating a checksum used in the preferred embodiment.

The next field in DDP packet 900 is the datagram length 902. 902 comprises the full length of datagram 911 (whose value may range between zero and 586). Datagram 911 is a part of field DDP packet 900 and contains certain data. The next field contains a DDP checksum 903 and is used for maintaining the integrity of the datagram if the sending node desires a checksum. The checksum computation process is shown in FIG. 10. The checksum is computed by totalling each byte of the datagram and then rotating the checksum one bit to the left for each byte totalled. Upon receiving the packet, a destination node if the source node uses checksum field 903, may compute the checksum and determine whether the datagram received has been damaged in transit. 904 and 905 are the destination and source network numbers, respectively, each two-bytes in length. These are the network number portions of the protocol addresses of the source and destination nodes. 906 and 907 are the source and destination node IDs, respectively, for that portion of the protocol address.

The next two fields 908 and 909 of the DDP header 900 are the destination and source socket numbers. A socket is often identified with a process in a node. DDP, therefore, allows process-directed datagram transmission. These sockets are each represented by one byte of information, and can be thought of as an extension of the 24-bit protocol address or concatenated network number and node ID. The last field in the DDP header 900 is the DDP type 910 of the datagram data contained within field 911.

The DDP packet 900 is built by the DDP process 409 residing in each node on the network. The datagram 911 will be transmitted either directly to the node on the local network or to a router connected to the local network (A-ROUTER) for transmission to a node elsewhere in the internet. This is accomplished by determining whether the destination network number is in the local network range (THIS-NETWORK-RANGE). If it is, then the datagram is sent directly to the destination node. This is done by inserting the hardware destination address in the ELAP field 301 shown in FIG. 3 (acquired from AARP) and transmitting the packet to the destination node. If, however, the destination network number is not in THIS-NETWORK-RANGE, then the DDP process 409 knows that the destination node is on another network, and the packet must be transmitted to A-ROUTER. A-ROUTER may be any router within the local network which has a port to another network. As a result, field 301 will contain the hardware address for A-ROUTER (obtained from AARP) if the node is not in the local network. When A-ROUTER receives the datagram, it will forward the datagram according to the DDP information given in 900 shown in FIG. 9 by building a new ELAP header 300 containing either the destination hardware address for the node on the local network or the next A-ROUTER in the internet.

Figure 11A:
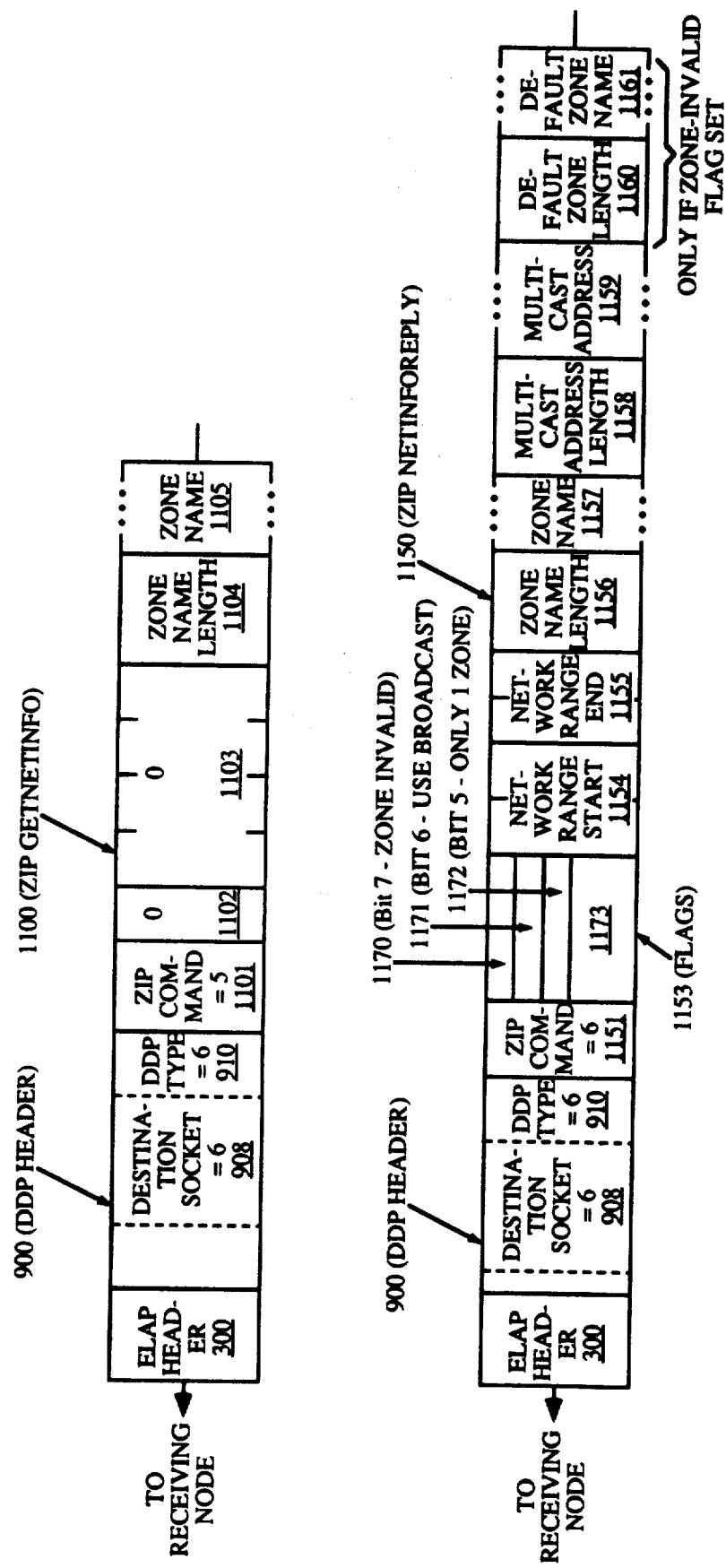
FIG. 11 shows packets used to transmit information to and from a router and nodes in the preferred embodiment for obtaining network information.
Figure 11B:
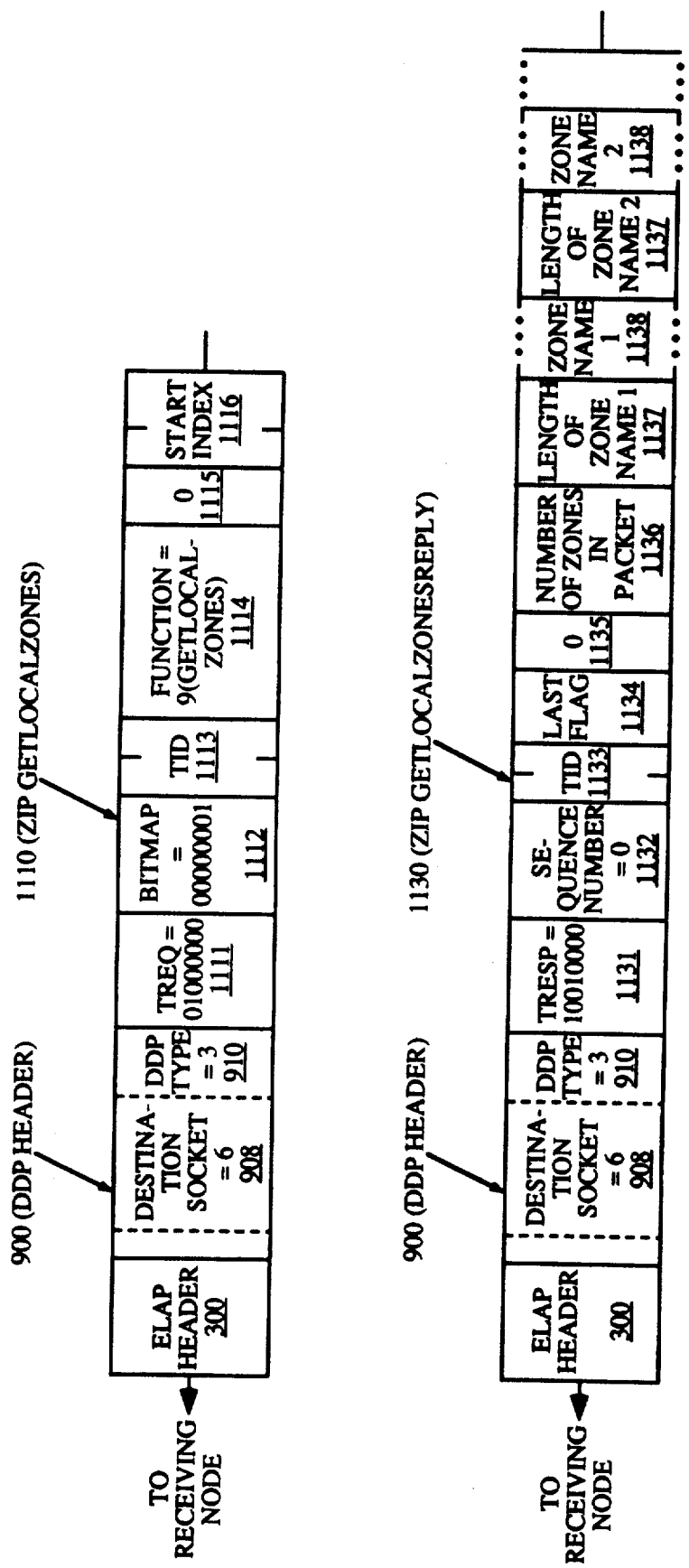

In addition to maintaining information about the router's ports using a port descriptor and the networks coupled to each port using a routing table, the router also maintains a list of "zones" residing on the internet. This list of zones is maintained using the Zone Information Protocol 418 (ZIP). This ZIP 418 resides at the session level 416 of the ISO-OSI model shown on FIG. 4. A zone is an arbitrary subset of nodes within the internet. ZIP process 418 keeps track of the zones in the internet through the use of a Zone Information Table (ZIT) consisting of entries for each network in the internet, indicating which zones are associated with that network. The ZIT is maintained by a ZIP process residing in the router. The ZIP process also responds to queries about zones by nodes in the network. The ZIT is maintained by the ZIP process, in conjunction with the routing table, so that there is one entry for each network in the internet. One query sent to the ZIP process by nodes is a ZIP GetNetInfo packet 1100 shown in FIG. 11. This packet requests zone information from the router. The router can respond with a ZIP NetInfoReply packet 1150 shown in FIG. 11. The ZIP GetNetInfo packet 1100 in FIG. 11 is known as a port-dependent request (it gives information about the LAN connected to the port from which the request came). The router will respond to a ZIP GetNetInfo packet 1100 with a ZIP NetInfoReply packet 1150.

The ZIP GetNetInfo packet 1100 in FIG. 11 will take the place of the datagram data field 911 shown in FIG. 9 and is part of the ELAP packet 300 and the DDP packet 900. TLAP packet 350 may be used place of ELAP packet 300 in an alternative embodiment wherein the DDP packet 900 and the ZIP GetNetInfo 100 will reside in data field 359 of TLAP packet 350. Field 908 of the DDP header for all of the ZIP commands contains a six and field 910 contains a six. The first field 1101 in packet 1100 contains five, indicating that this is a ZIP GetNetInfo packet. 1102 and 1103, the next five bytes of packet 1100 are ignored by the ZIP process in the router. The zone name length, byte 1104, specifies the length of the zone name in field 1105 and is the zone name for which information is sought. If the requesting node does not know a zone name at the time the ZIP GetNetInfo 1100 is transmitted, then field 1104 contains zero and zone name field 1105 is not used.

In response to a ZIP GetNetInfo 1100 received, the router will provide zone information using a ZIP NetInfoReply 1150 shown in FIG. 11. ZIP NetInfoReply 1150 is part of ELAP packet 300 and DDP header 900. The ZIP command field 1151 contains six, indicating that this is a ZIP NetInfoReply. The next field 1152 is a single byte comprising flags 1171, 1172 and 1173, bits 7, 6 and 5, the high order bits, respectively. The flag bits, when set, each have a predetermined meaning, as follows:

- bit 7—1170, indicates that the zone name requested is invalid for the network from which the request came;
- bit 6—1171, indicates that the node should use the data link broadcast address because the link does not support multicast; and
- bit 5—1172, indicates that the network has only one zone.

The remaining portion 1173 of the flags field 1153 is not used.

The next 2 byte field 1154 is used to return the starting network number for the network connected to the port from which the request was received. As mentioned previously, each port on an IR has a network range known as THIS-NETWORK-RANGE associated with it in the preferred embodiment. In an alternative embodiment, the router may simply keep a list of network numbers which are connected to the router. The THIS-NETWORK-RANGE used in the preferred embodiment is contiguous. Field 1154 represents the beginning of the network number range, and field 1155 represents the end of the network number range. Both 1154 and 1155 are two bytes in length. The next one byte field 1156 is used for representing the length of the zone name 1157 returned to the requesting node. Field 1157 contains the zone name, if any, which is returned to the requesting node. The zone name is returned if the requesting node provided a zone name or the network resides in only one zone. A network residing in only one zone is indicated by bit 1172 being set in the packet. Fields 1158 and 1159 are the multicast address length and the multicast address, respectively, for the zone name returned in field 1157. If bit 1171 (bit 6) is set in the ZIP GetNetInfo packet 1100, then the multicast address field 1159 will be not be used and the multicast address length 1158 will contain zero.

The multicast address provided in field 1159 of ZIP NetInfoReply 1150 is used to send data packets to nodes residing in a specific zone. A multicast address is associated with each zone name on a given network so that nodes residing in the zone will receive the packet and nodes not residing in the zone will generally not need to process the packet in any way. The multicast address is derived from the zone name by the router using the same process 1000 in FIG. 10 to compute the datagram checksum. In this case, however, the zone name (an ASCII string between 1 and 32 characters in length, excluding the length field) is converted to uppercase and is used byte-by-byte for computation of an index into a hash table. Once the hash value H, derived from the checksum process, has been determined, the value is used for a look-up into an ordered list of zone multicast addresses. If there are N zone multicast addresses in the table, (address $A_0$–$A_{N-1}$) then the multicast address associated with H is the element $A_{H \bmod N}$ wherein mod is the modulo function (the remainder in a whole number divide when H is divided by N). In general, N should be a prime number so that the zone name hashes evenly into a zone multicast address.

The multicast capability is provided by the underlying ETHERNET or Token-ring hardware. In the preferred embodiment, using ETHERNET hardware, the multicast addresses in the hash table range from $090007000000($A_0$)$ to $0900070000FC$ ($A_{252}$). In the Token-ring system of the alternative embodiment, the addresses in the hash table range from $C00000000800($A_0$)$, $C00000001000($A_1$)$ to $C00020000000($A_{18}$)$.

A broadcast address, in contrast, is an address to which a packet is sent, such that the packet is received by all nodes on a network. The broadcast address for APPLETALK ®(brand networking system) is network $0000, node $FF. This protocol broadcast address may be translated into an ETHERNET broadcast address ($090007FFFFFF) in the preferred embodiment, or a Token-ring broadcast address ($C0040000000) in an alternative embodiment. Network specific broadcasts may also be accomplished wherein the node ID portion of the protocol address is set equal to $FF, for the particular network number comprising the remainder of the protocol address. In other words, only nodes with a certain network number in their protocol address will receive the packet.

Fields 1160 and 1161 of packet 1150 contain a default zone name 1161, and the length of the default zone name 1160. A default zone is one in which all nodes on a network not otherwise assigned a zone reside. These fields are used only if the "zone invalid" bit 1170 has been set in packet 1150, indicating that the requested zone does not exist for the requested network. In the case that the requested zone does exist, these fields do not exist.

Nodes receiving ZIP NetInfoReply packets 1150 register to receive all packets sent to the indicated zone multicast address. This may be accomplished by having the node choose a zone name and register on the associated zone multicast address at a predetermined time (for instance node startup or node initialization). This may be accomplished by obtaining a list of the zones available on the local network and allowing the user to select one of those zones. The list of local zone names is obtained using ZIP GetLocalZones 1110 shown in FIG. 11, which is transmitted by the node to a router. The list of zone names may then be displayed from the plurality of fields 1138 provided in the ZIP GetLocalZones-Reply packet 1130 responding to the ZIP GetLocalZones 1110. Then, the user may choose a zone name using a dialog box or other technique common in the MACINTOSH. Once a zone is chosen, another ZIP GetNetInfo packet 1100 must be sent to the router to obtain the zone multicast address of the selected zone. After the default zone name has been chosen or a valid zone name has been selected by the user using a dialog box, the node is registered on this zone multicast address provided in field 1159 of the ZIP NetInfoReply packet 1150.

Another sub protocol used in the preferred embodiment of the present invention is the Name Binding Protocol 415 residing at the Transport level 411 of the ISO-OSI model shown in FIG. 4. The Name Binding Protocol (NBP) 415 is used to substitute names for sockets in nodes having particular protocol addresses on the network (the clients of such sockets are also known as network visible entities or NVE's.) An NVE is the client of a socket (process) residing in a given node which is accessible to other nodes on the network using DDP.

Entity names for NVE's may be broken into three fields: Object; Type; and Zone; and are represented in the following format: OBJECT: TYPE @ ZONE. Each string for the object, type and zone is limited to a maximum of 32 characters in length. For instance, an entity name may be represented as "Judy: Mailbox@Bandley 3," wherein "Judy" represents the object field, "mailbox" represents the type field, and "Bandley3" is the zone field.

In the entity name, certain special characters may be used to reference multiple strings. For the object and type fields, a single equals sign ("=") wild card can be used signifying all possible values of that string. A single approximately equals sign ("≈") can be used to match zero or more characters anywhere within an object or type string. For a zone field, an asterisk ("*") can be substituted signifying the zone in which the node specifying the name resides.

Entity names are case insensitive. That is, an entity name represented in lower case letters will represent the same entity if represented in upper case letters. Therefore, before determining a match for an NVE, all characters should be converted to either upper or lower case. For certain characters in certain foreign languages, special cases exist for case conversion since a lower case é may be conveted to É, but in another language may be converted to an E. Therefore, in the present invention, characters are converted in the manner according to the following table 1. As a result, in the preferred embodiment of the present invention, an "a" ($61 hexadecimal) is equivalent to an "A" ($41 hexadecimal). The remaining characters are converted in a manner consistent with the following table.

TABLE 1

| Lowercase-to-Uppercase Equivalence | | | |
|---|---|---|---|
| Lowercase | | Uppercase Equivalent | |
| Value (Hexadecimal) | Character | Value (Hexadecimal) | Character |
| $61 | a | $41 | A |
| $62 | b | $42 | B |
| . | . | . | . |
| . | . | . | . |
| . | . | . | . |
| $7A | z | $5A | Z |
| $88 | à | $CB | Á |
| $8A | ä | $80 | Ä |
| $8B | ã | $CC | Ã |
| $8C | å | $81 | Å |
| $8D | ç | $82 | Ç |
| $8E | é | $83 | É |
| $96 | ñ | $84 | Ñ |
| $9A | ö | $85 | Ö |
| $9B | o | $CD | O |
| $9F | ü | $86 | Ü |
| $BE | æ | $AE | Æ |
| $BF | ø | $AF | Ø |
| $CF | œ | $CE | Œ |

Each node maintains a Names Table containing name-to-entity internet address mappings (known as NBP Name-address tuples) of all NVE's in the node.

The Names Directory (ND) is the union of all Names Tables for the node in the internet. Therefore, each node maintains its own listing of names for sockets within it, with protocol address and socket number mappings. The address associated with any name of a process in a given node on a local area network may be obtained by sending a suitable NBP packet shown in FIG. 12 as packet 1200. Sockets within a node may have multiple names associated with them. In other words, one protocol address and socket number may have multiple entity names associated with it.

Within NBP 415, there are four basic services provided: name registration; name deletion; name look-up; and name confirmation. These four services are provided by a process residing in each node on a socket known as the Names Information Socket (NIS). Name registration may be performed by verifying that the name and type are unique in the node's zone and inserting the entity name, the network address, node ID, and socket number into the node's Names Table. An NVE may also delete its name-to-address mapping to make itself invisible. Name look-up may also be done in each of the Names Tables of all nodes residing on the local network. Finally, a name may be confirmed by searching in each node for a specific name-to-address mapping.

Figure 12:
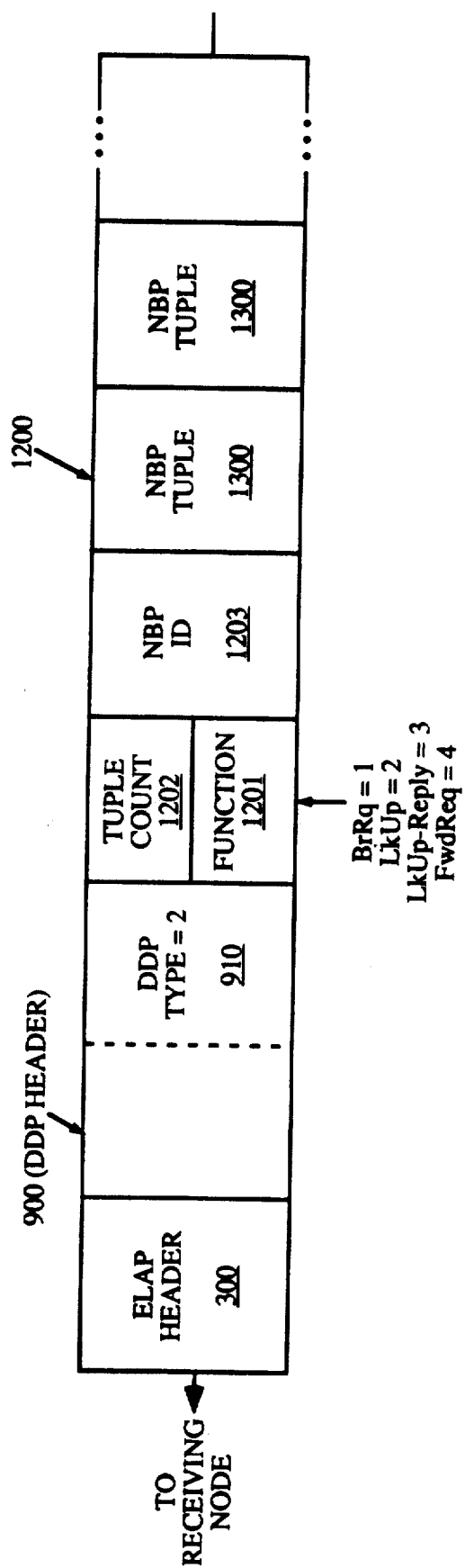
FIG. 12 shows a packet used for obtaining name information using the Network Binding Protocol (NBP).

The NBP packet 1200 shown in FIG. 12 is used in many of the preceeding four operations. The NBP packet 1200 comprises an ELAP packet 300 (TLAP packet 350, in an alternative embodiment) and the DDP packet 900. The NBP packet 1200 will reside in the datagram field 911 of DDP packet 900. Note that NBP packet 1200 is a DDP type of two as shown in field 910. Packet 1200 comprises a first byte divided into a function field 1201 and a tuple count 1202 wherein the function field comprises the four most significant bits of the byte, and the tuple count 1202 comprises the four least significant bits of the byte. Function field 1201 will contain: one for a Broadcast Request (BrRq); two for a Look-Up request (LkUp); three for a Look-Up Reply packet (LkUp-Reply); and four for a Forward Request (FwdReq) packet. The tuple count 1202 indicates the number of NBP tuples 1300 which follow in packet 1200. There is a maximum of 15 NBP tuples 1300 which may be a part of packet 1200. Note that in the BrRq, FwdReq, and LkUp packets the tuple count field 1202 always contains one.

The next field in NBP packet 1200 is NBP ID field 1203. NBP ID field 1203 contains an 8-bit sequentially generated value which will uniquely identify the NBP packet being transmitted. This allows multiple NBP requests to be outstanding on the internet. Using NBP ID field 1203, a transmitting NBP process is able to determine whether a particular packet is in response to an earlier packet the process transmitted. A responding node will always transmit the same value in the NBP ID field 1203 as the packet it is responding to. The next field in packet 1200 is the NBP tuple field 1300, which is discussed with reference to FIG. 13. Note that there may be a plurality of NBP tuple fields 1300 (a maximum of 15), as shown in FIG. 12, but only when the function field 1201 contains three (Indicating a NBP LkUpReply) and tuple count field 1201 is greater than one.

Figure 13:
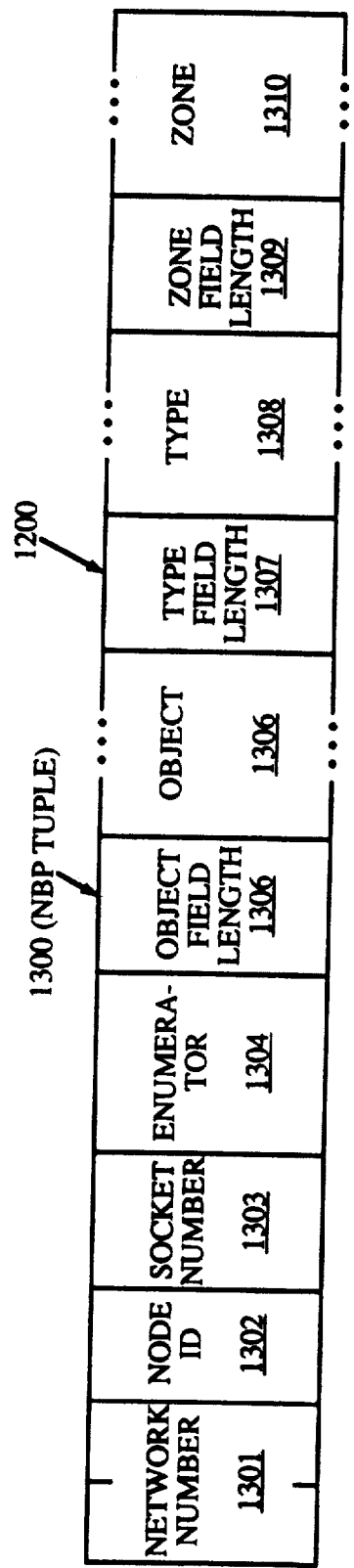
FIG. 13 shows a detailed representation of an "NBP Tuple" used to keep track of name information in the preferred embodiment.

An example of one NBP Tuple 1300 is shown in FIG. 13. NBP Tuple 1300 comprises three fields 1301, 1302 and 1303 indicating the network number, node ID, and socket number, respectively, of the NVE. The next field, the enumerator field 1304, is one-byte in length and is used to distinguish between multiple names registered on the same socket.

The remainder of NBP Tuple 1300 includes information about the NVE. Fields 1305 and 1306 comprise the object field length and object name, respectively. The object field length indicates the length of object name 1306 in bytes. The next two fields are the type field length 1307 and the type name 1308. Again, type field length 1307 indicates the length, in number of bytes, of type field 1308. Fields 1309 and 1310 are used to represent the zone field length and zone name, respectively. The zone field length 1309 represents the length of the zone name in number of bytes. Notice that if zone length field 1309 contains zero then the name zone is treated as if it were an asterisk ("*") wildcard, indicating that the NVE indicated by the tuple resides in the zone in which the node receiving the tuple resides.

Figure 14:
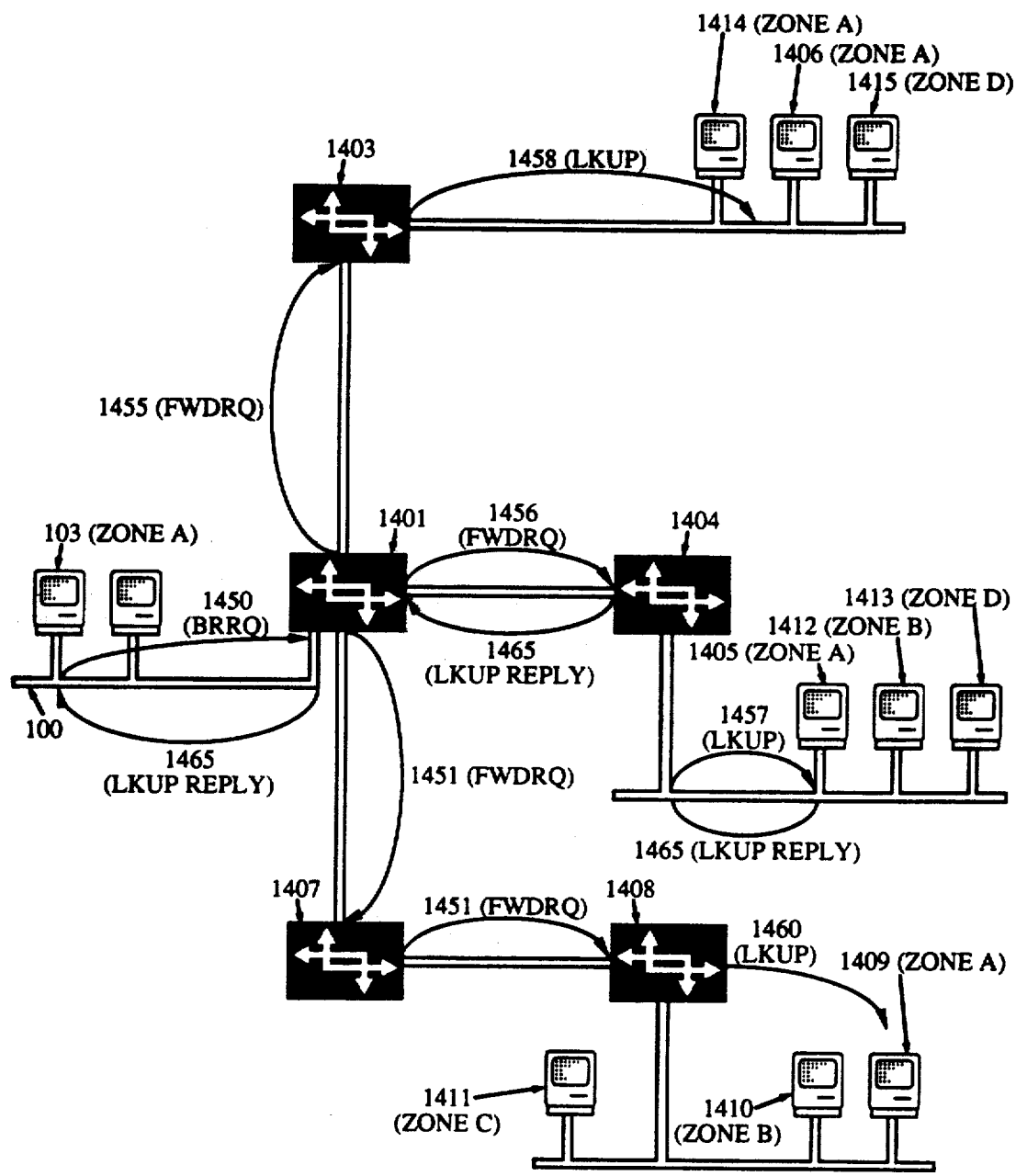
FIG. 14 is a representation of device location using packets transmitted by a requesting node, which packets are transformed by internet routers en route to the device.
Figure 16:
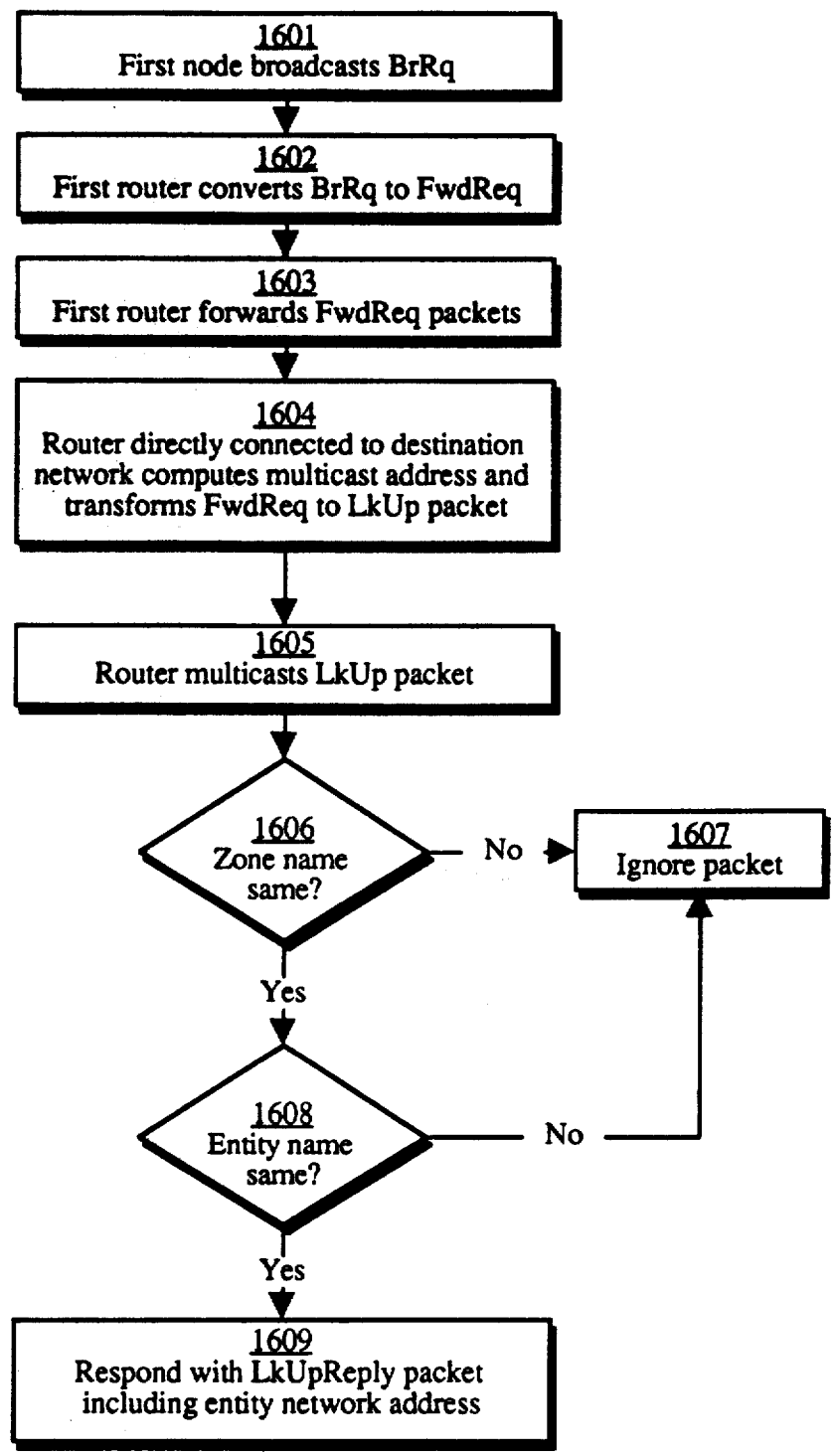
FIG. 16 is a process flow diagram of the method used by the preferred embodiment for network device location using multicast.

The process of the present invention is shown and discussed with reference to FIG. 14. FIGS. 14 and 16 shows how one node, for example 103, may transmit a packet such as BrRq packet 1450, to determine the address associated with a specific entity name on the internet. This method may also be used to determine whether a particular entity name is in use. Node 103's NBP process will send the BrRq packet 1450 to a router on the local network such as 1401 shown in FIG. 14 at step 1601 in FIG. 16. The BrRq packet 1450 will contain an NBP packet whose function field 1201 will contain one and the tuple count field 1202 will also contain a one. In the NBP Tuple 1300 of BrRq 1450 the network number 1301, the node ID 1302, and the socket number 1303 will contain the values for the socket in the node requesting the location of the node with the specified entity name. The fields 1305-1310 will contain the names of the object, type and zone of the NVE for which the socket wishes to determine the address. The ELAP and DDP destination addresses contained in fields 301 and 904 will indicate the ETHERNET and protocol addresses of the router to which the BrRq packet 1450 is sent.

Upon receipt of BrRq packet 1450, router 1401 shown in FIG. 14 will convert BrRq packet 1450 received from the port into a series of FwdReq packets 1451, 1455 and 1456 ultimately transmitted to all routers directly connected to networks whose zone lists include the desired zone such as zone "A" in this example. This is shown at step 1602 in FIG. 16. The zone is determined by checking field 1310 of the NBP tuple in BrRq 1450. Upon receipt of BrRq 1450, the router searches in its Zone Information Table (ZIT) to see which networks include this zone name. Once this set of networks have been determined the router transmits FwdReq packets 1451, 1455 and 1456 to a router connected to each of these networks (possibly going through intermediate routers along the way as in the case of FwdReq 1451). The DDP header destination network number 904 comprises the first network number in the network range for each network in the zone, and the destination node ID field 906 contains zero, indicating that the FwdReq packet will be sent to the first router directly connected to each of these networks. The only transformation of the remainder of BrRq packet 1450 is done in the function field 1201, wherein the one (indicating a BrRq) is replaced by a four (indicating a FwdReq).

At this point, as shown in FIG. 14, each of the FwdReq packets 1451, 1455, and 1456 are first transmitted to the next routers 1403, 1404, and 1407 for forwarding to the destination nodes and/or other routers. This is shown at step 1603 in FIG. 16. When the packet is ultimately received by a router directly connected to the destination network, then the packet is transformed to a LkUp packet at step 1604 in FIG. 16. The NBP LkUp packets are shown as 1457, 1458, and 1460 on FIG. 14. The LkUp packets are transmitted to the ELAP multicast address for the given zone (TLAP is an alternative embodiment) at step 1605 in FIG. 16. In order to do this, a zone multicast address must be computed at step 1604 in FIG. 16 for the zone name given in field 1310 of NBP Tuple 1300 using the process described above. The multicast address will be inserted in field 301 of ELAP header 300 and will enable most nodes not residing in the zone to not even see the LkUp packet. Therefore, when the LkUp packet is transmitted, it is received and acted upon only by nodes within the zone multicast address.

Because there may be a multiplicity of zone names on a given network, and the networking hardware used in the internet (either ETHERNET or Token-ring) only has a fixed number of multicast addresses for use as zone multicast addresses associated with it (253 zone multicast addresses for ETHERNET and 19 zone multicast addresses for Token-ring) the node must also determine whether the packet transmitted is for the zone in which the node resides. The algorithm which determines the multicast address for the zone will map certain zone names to the same multicast address. So, before acting upon a packet received, such as the LkUp packets 1457, 1458, and 1460, the node must determine whether the packet is sent to the zone in which the node resides. This is done by examining field 1310 of the NBP tuple 1300 contained within the LkUp packet transmitted. This is shown at step 1606 of FIG. 16. Each node maintains a variable known as THIS-ZONE which indicates the node's current zone. If the value contained within THIS-ZONE is the same as the zone name contained within field 1310 of NBP tuple 1300 in the LkUp packets, then the packet is accepted and acted upon at steps 1608 and 1609 in FIG. 16. If, however, the zone names are different, then the packet is ignored by the receiving node at step 1607 FIG. 16. For instance, if zone "D" and zone "A" (for which the packet was transmitted) mapped to the same multicast address, then node 1413 which resides in zone "D" will receive the LkUp packet 1457, and will check the zone field to see whether it is within the same zone as specified in field 1310. Since 1413 is in zone "D" then LkUp packet 1457 is ignored by node 1413.

The LkUp packets shown as 1457, 1458 and 1460 are received by the nodes 1405, 1406 and 1409 on the local networks because they all reside in zone "A". If any contain the entity name specified in the NBP Tuple 1300 in its Names Table, as determined at step 1608 in FIG. 16, then a LkUpReply packet such as 1465 is transmitted back to the router on the local network for forwarding to the requesting node as shown at step 1609 in FIG. 16. LkUpReply packet 1465 in FIG. 14 will contain the value three in function field 1201, indicating that it is a LkUpReply packet.

The LkUpReply packet 1465 is ultimately transmitted to the node from which the BrRq 1450 originated, by inserting the source node address from the BrRq packet 1450 and LkUp packet 1457 into the destination fields of the LkUpReply packet 1465. The NBP tuple's entity address fields 1301-1303 of the LkUpReply packet 1465 contain the source protocol address for node 1405 shown in FIG. 14 and the socket number with the entity name so that the node that transmitted the BrRq 1450 will know the location of the NVE with the entity name. In addition, when the transmitting node 103 receives the LkUpReply packet 1465 forwarded by the intervening routers, it will know that the entity name is not available for use by node 103 (or any other process in zone "A" for that matter).

Figure 15:
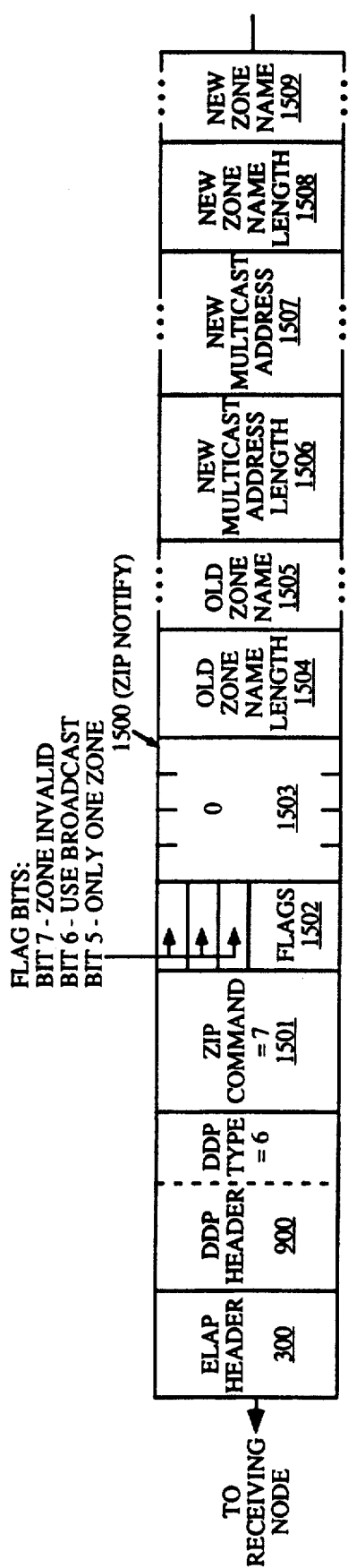
FIG. 15 is a representation of a packet used in the preferred embodiment for updating zone information for a node in a network.

Sometimes the name of the zone in which a node resides may be changed. This is indicated to the node through receipt of a packet known as a ZIP Notify packet. The ZIP Notify packet is shown as 1500 and is discussed with reference to FIG. 15. Packet 1500 essentially comprises the same format as ZIP NetInfoReply shown as 1150 in FIG. 11. The ZIP Notify packet 1500 is transmitted to all nodes in the zone whose name is being changed. As in the ZIP NetInfoReply packet the DDP type field 910 is equal to six. In this case, the ZIP command field 1501 is qual to seven. Like the ZIP NetInfoR ply 1150, the ZIP Notify packet 1500 comprises a flags byte 1502 comprising bits having the same meanings as 1153 in the ZIP NetInfoReply 1150. The network start and end range fields are now an unused four bytes field 1503 containing zero. Packet 1500 further comprises an old zone name field 1505 and an old zone name length field 1504. Packet 1500 further comprises a new multicast address field 1507 and a new zone name field 1509 with their respective length fields 1506 and 1508. Therefore, when a zone name is changed, the node must verify that the value contained in field 1505 of ZIP Notify packet 1500 equals the THIS-ZONE variable stated in the node (i.e. that the node is in the zone whose name is being changed). It must then register on the zone multicast address contained in field 1507, and update its THIS-ZONE variable to have the same value as contained in field 1509.

Thus, an invention for network device location has been described. Although the present invention has been described particularly with reference to FIGS. 1-16, it will be apparent to one skilled in the art that the present invention has utility far exceeding that disclosed in the Figures. It is contemplated that many changes and modifications may be made, by one of ordinary skill in the art, without departing from the spirit and scope of the invention, as disclosed above.

What is claimed is:

1. In a communication system for transferring data between a plurality of devices, a method for determining the location of a first entity on the communication system, comprising the steps of:

a. a second entity transmitting a first signal to a first routing means connected to a first local network of the communication system, wherein the first signal includes an alias, wherein the alias includes a zone name, and the first local network includes the second entity;

b. the first routing means translating the first signal into a second signal which includes the alias, and transmitting the second signal to at least one second routing means, each at least one second routing means coupled to at least one second local network of the communication system;

c. each at least one second routing means computing a second zone multicast address from said zone name, translating the second signal into a third signal which includes the alias, and the second zone multicast address, and transmitting the third signal to a first set of nodes, the first set of nodes comprising at least one first node, each node of the first set of nodes having a first zone multicast address, wherein the first zone multicast address is equivalent to the second zone multicast address;

d. each node of the first set of nodes determining whether the zone name contained within the alias is equal to a zone identifier contained in each node of the first set of nodes, the first set of nodes comprising a second set of nodes, each node of the second set of nodes having the zone identifier equal to the zone name contained within the alias e. each node of the second set of nodes determining whether the alias contained within the third signal is equal to alias information contained within each node of the second set of nodes, the second set of nodes comprising the first entity, the first entity having an alias equal to the alias contained within the third signal; and f. the first entity transmitting a fourth signal to the second entity, the fourth signal including the address of the first entity.

2. The method of claim 1 wherein the communication system comprises a an ETHERNET networking system.

3. The method of claim 1 wherein the communication system comprises a token-ring networking system.

4. The method of claim 1 wherein the communication system comprises a fiber distributed data interchange networking system.

5. The method of claim 1 wherein the alias comprises an alphanumeric value.

6. The method of claim 1 wherein the alias further comprises a type and object portion.

7. In a communication system, a method for determining the network address of an entity having an entity name comprising the following steps:

a. a first entity transmitting a first signal to a first routing means connected to a first local network of the communication system, the first signal including said entity name, said entity name including a zone name;

b. said first routing means translating said first signal into a second signal, said second signal including said entity name, said first routing means further transmitting said second signal to a second routing means, said second routing means coupled to a second local network comprising said zone name;

c. said second routing means computing a zone multicast address from said zone name, translating said second signal into a third signal, said third signal including said entity name and said zone multicast address, and transmitting said third signal to a first set of nodes coupled to said second routing means, each first node of said first set of nodes comprising said zone multicast address, said first set of nodes comprising a second set of nodes, each second node of said second set of nodes having a zone identifier equal to said zone name of said entity name;

d. each first node of said first set of nodes receiving said third signal, determining whether said zone name of said entity name is equal to a zone identifier associated with said each first node, and taking no action if said entity name is not equal to a zone identifier associated with said each first node;

e. each second node of said second set of nodes determining whether said entity name is equal to a node entity name of said each second node, said second set of nodes comprising a second entity having a second node entity name equal to said entity name contained within said third signal, each second node taking no action if said node entity name is not equal to said entity name; and f. said second entity transmitting a fourth signal to said first entity, and fourth signal including a network address of said second entity.

8. The method of claim 7 wherein said communication system comprises an ETHERNET networking system.

9. The method of claim 7 wherein said communication system comprises a token-ring networking system.

10. The method of claim 7 wherein said communication system comprises a fiber distributed data interchange networking system.

11. The method of claim 7 wherein said entity name comprises an alphanumeric value.

12. The method of claim 7 wherein said step of computing said zone multicast address comprises performing a hashing function upon said zone name.

13. In a communication system, an apparatus for determining the network address of an entity having an entity name comprising:

a. a first entity including a means for transmitting a first signal to a first routing means connected to a first local network of the communication system, the first signal including said entity name, said entity name including a zone name;

b. said first routing means including means for translating said first signal into a second signal responsive to receipt of said first signal, said second signal including said entity name, said first routing means further including means for transmitting said second signal to a second routing means, said second routing means coupled to a second local network comprising said zone name;

c. said second routing means including means for computing a zone multicast address from said zone name responsive to receiving said second signal, means for translating said second signal into a third signal, said third signal including said entity name and said zone multicast address, and means for multicasting said third signal to a first set of nodes coupled to said second routing means, each first node of said first set of nodes comprising said zone multicast address, said first set of nodes comprising a second set of nodes, each second node of said second set of nodes having a zone identifier equal to said zone name of said entity name;

d. each first node of said first set of nodes comprising means for receiving said third signal and means for determining whether said zone name of said entity name is equal to a zone identifier associated with said each first node;

e. each second node of said second set of node comprising means for determining whether said entity name is equal to a node entity name of said each second node, said second set of nodes comprising a second entity having a second node entity name equal to said entity name contained within said third signal; and f. said second entity comprising means for transmitting a fourth signal to said first entity responsive to said third signal, said fourth signal including a network address of said second entity.

14. In a communication system, a method for determining the network address of an entity having an entity name comprising the following steps:

a. a first entity broadcasting a first signal to at least one first routing means connected to a first local network of the communication system, the first signal including said entity name, said entity name including a zone name;
b. said at least one first routing means forwarding a second signal to at least one second routing means until a third routing means receives said second signal, said second signal comprising said entity name, said third routing means being coupled to entities having the zone indicated by said zone name of said entity name;
c. said third routing means computing a zone multicast address from said zone name in said second signal, generating a third signal from said second signal, said third signal including said entity name and said zone multicast address, and multicasting said third signal to a first set of nodes coupled to said third routing means, each first node of said first set of nodes comprising said zone multicast address, each first set of nodes comprising a second set of nodes, each second node of said second set of nodes having a zone identifier equal to said zone name of said entity name;
d. each first node of said first set of nodes receiving said third signal, determining whether said zone name of said entity name is equal to a zone identifier associated with said each first node, and taking no action if said entity name is not equal to a zone identifier associated with said each first node;
e. each second node of said second set of nodes determining whether said entity name is equal to a node entity name of said each second node, said second set of nodes comprising a second entity having a second node entity name equal to said entity name contained within said third signal, each second node taking no action if said node entity name is not equal to said entity name; and
f. said second entity transmitting a fourth signal to said first entity responsive to said third signal, said fourth signal including a network address of said second entity.

* * * * *